United States Patent [19]
Hug et al.

[11] Patent Number: 6,150,662
[45] Date of Patent: Nov. 21, 2000

[54] GANTRY FOR MEDICAL IMAGING SYSTEM

[75] Inventors: Paul Hug, Saratoga; Ottavio T. Rotondale, Belmont; Caleb J. L. Zhang, Fremont; Tam Huynh, Livermore, all of Calif.

[73] Assignee: ADAC Laboratories, Milpitas, Calif.

[21] Appl. No.: 09/071,367

[22] Filed: Apr. 30, 1998

[51] Int. Cl.$^7$ .................................................. G01T 1/166
[52] U.S. Cl. .............................. 250/363.05; 250/363.08
[58] Field of Search ........................... 250/363.05, 363.08

[56] References Cited

U.S. PATENT DOCUMENTS

| | | |
|---|---|---|
| Re. 29,216 | 5/1977 | Colombo et al. . |
| 1,599,696 | 9/1926 | Wantz . |
| 2,595,620 | 5/1952 | Hollstein . |
| 3,011,057 | 11/1961 | Anger . |
| 3,281,598 | 10/1966 | Hollstein . |
| 3,549,885 | 12/1970 | Andersson . |
| 3,617,749 | 11/1971 | Massiot . |
| 3,697,751 | 10/1972 | Tschunt . |
| 3,735,132 | 5/1973 | Carugati et al. . |
| 3,756,549 | 9/1973 | Lange . |
| 3,845,308 | 10/1974 | Cattrell . |
| 3,852,601 | 12/1974 | Casale . |
| 3,870,886 | 3/1975 | Casale . |
| 3,935,462 | 1/1976 | De Luca et al. ......................... 250/369 |
| 3,976,885 | 8/1976 | Brunnett et al. . |
| 4,049,966 | 9/1977 | Luitwieler, Jr. . |

(List continued on next page.)

FOREIGN PATENT DOCUMENTS

| | | |
|---|---|---|
| 0 465 952 A2 | 6/1991 | European Pat. Off. . |
| 2 014 303 | 10/1971 | Germany ........................... 250/363.08 |
| 8004906A | 3/1981 | Netherlands . |
| 1175032 | 4/1968 | United Kingdom . |
| 1572809 | 12/1975 | United Kingdom . |
| 1540365 | 9/1977 | United Kingdom . |
| 2 120 060 | 4/1983 | United Kingdom . |
| WO 92/07512 | 10/1991 | WIPO . |

OTHER PUBLICATIONS

Bernard E. Oppenheim, et al., "Single Photon Emission Computed Tomography", *Effective Use of Computers in Nuclear Medicine*, Jan., 1998, pp. 31–74.

David B. Kuhl, M.D., et al., "Cylindrical and Section Radiosotope Scanning of the Liver and Brain," Nov., 1984, pp. 926–935.

Gottschalk, et al., "SPECT Resolution and Uniformity Improvements by Noncircular Orbit", The Journal of Nuclear Medicine, vol. 24, No. 9, Apr. 8, 1983, pp. 822–828.

Stefan P. Mueller, et al., "Collimator Selection for SPECT Brain Imaging: The Advantage of High Resolution," The Journal of Nuclear Medicine Nov. '1986, vol. 27, pp. 1729–1738.

Robert L.. Eisner, "Principles of Instrumentation in SPECT," Journal of Nuclear Medicine Technology, Mar. 1995, vol. 13, No. 1, pp. 23–31.

(List continued on next page.)

*Primary Examiner*—Constantine Hannaher
*Attorney, Agent, or Firm*—Blakely, Sokoloff, Taylor & Zafman LLP

[57] ABSTRACT

A nuclear medicine imaging system provides three-axis linear and rotary detector motion. The imaging system includes an overhead gantry, which includes a carriage supported above the object and movable in translation along a first horizontal axis. Support arms are suspended downward from the carriage and are movable along a second horizontal axis perpendicular to the first horizontal axis. A detector is coupled to a lower end of each support arm. Each support arm is retractably extendible along a substantially vertical axis, and each detector is pivotable about a horizontal axis parallel to the first horizontal axis. Each support arm cooperates with the carriage to enable the corresponding detector to be positioned at multiple angular positions about a longitudinal axis corresponding to multiple projection angles by using combinations of independent linear movements of the detectors along any of three perpendicular axes.

53 Claims, 22 Drawing Sheets

U.S. PATENT DOCUMENTS

| | | |
|---|---|---|
| 4,057,727 | 11/1977 | Muehllehner et al. . |
| 4,064,441 | 12/1977 | Casale . |
| 4,150,297 | 4/1979 | Borggren . |
| 4,216,381 | 8/1980 | Lange . |
| 4,223,222 | 9/1980 | Gray et al. . |
| 4,368,389 | 1/1983 | Blum . |
| 4,400,620 | 8/1983 | Blum . |
| 4,401,890 | 8/1983 | Blum . |
| 4,426,725 | 1/1984 | Grady . |
| 4,445,035 | 4/1984 | Ueyama . |
| 4,476,389 | 10/1984 | Ueyama et al. . |
| 4,503,331 | 3/1985 | Kovacs, Jr. et al. . |
| 4,613,122 | 9/1986 | Manabe . |
| 4,645,933 | 2/1987 | Gambini et al. . |
| 4,652,758 | 3/1987 | Barfod . |
| 4,652,759 | 3/1987 | Platz . |
| 5,349,190 | 9/1994 | Hines et al. . |
| 5,367,169 | 11/1994 | Pierfitte . |
| 5,444,252 | 8/1995 | Hug et al. . |
| 5,523,571 | 6/1996 | Velazquez et al. . |
| 5,594,251 | 1/1997 | Fleury et al. . |
| 5,691,538 | 11/1997 | Ohike et al. ........................ 250/363.05 |
| 5,712,482 | 1/1998 | Gaiser et al. ....................... 250/363.08 |

OTHER PUBLICATIONS

John W. Keyes, Jr., M.D., "Computed Tomography in Nuclear Medicine," Lieberman, D.E., Computer Methods, C.V. Mosby Co., St. Louis, 1977, pp. 130–138.

Lim et al., "Performance Analysis of Three Camera Configurations for Single Photon Emission Computer Tomography," IEEE Transactions on Nuclear Science, Feb. 1980, pp. 559–568.

U.S. Statutory Invention Registration, H12, "Nuclear Medicine Imaging System," Gerald W. Bennett, et al., Published Jan. 7, 1986.

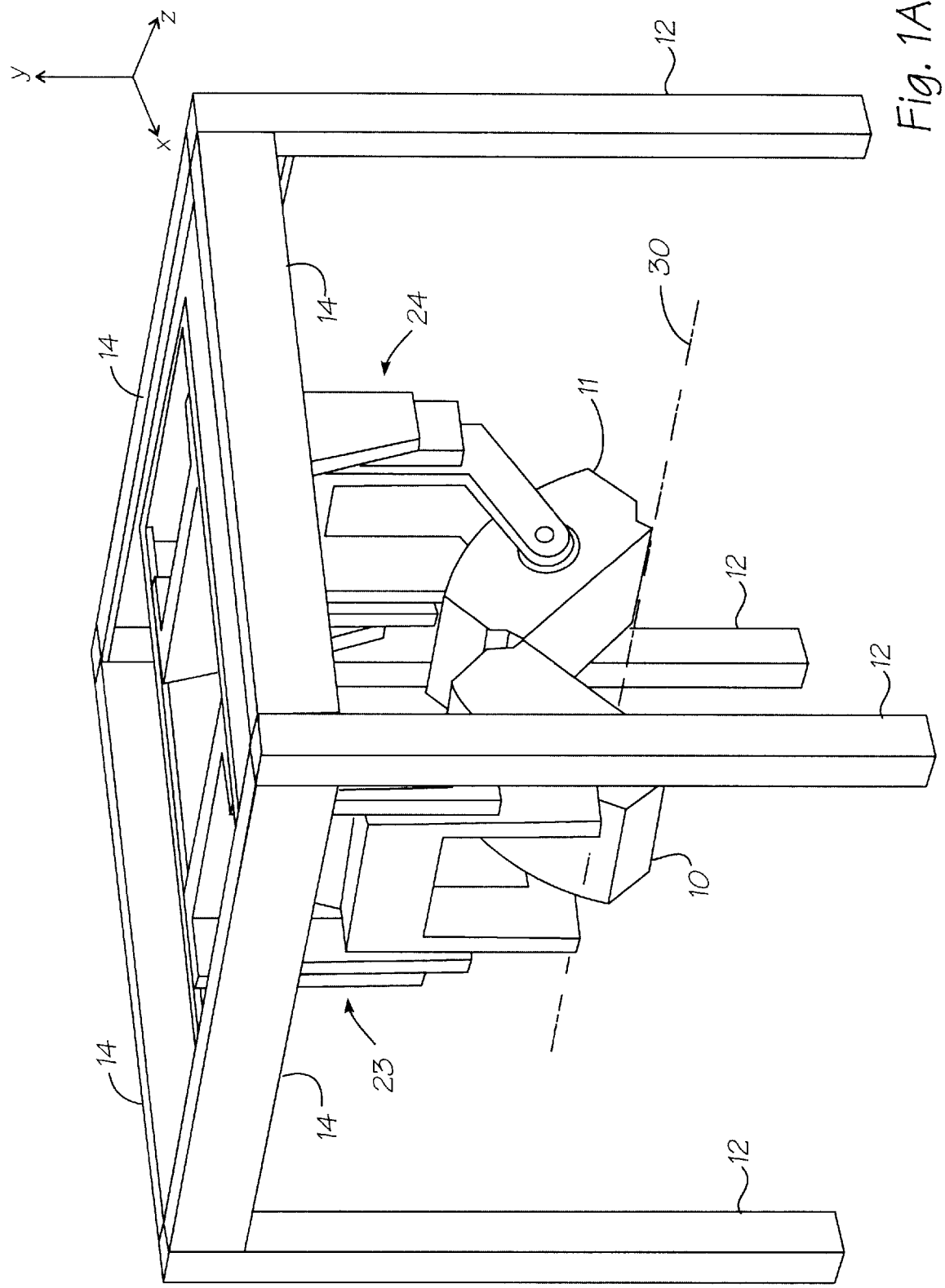

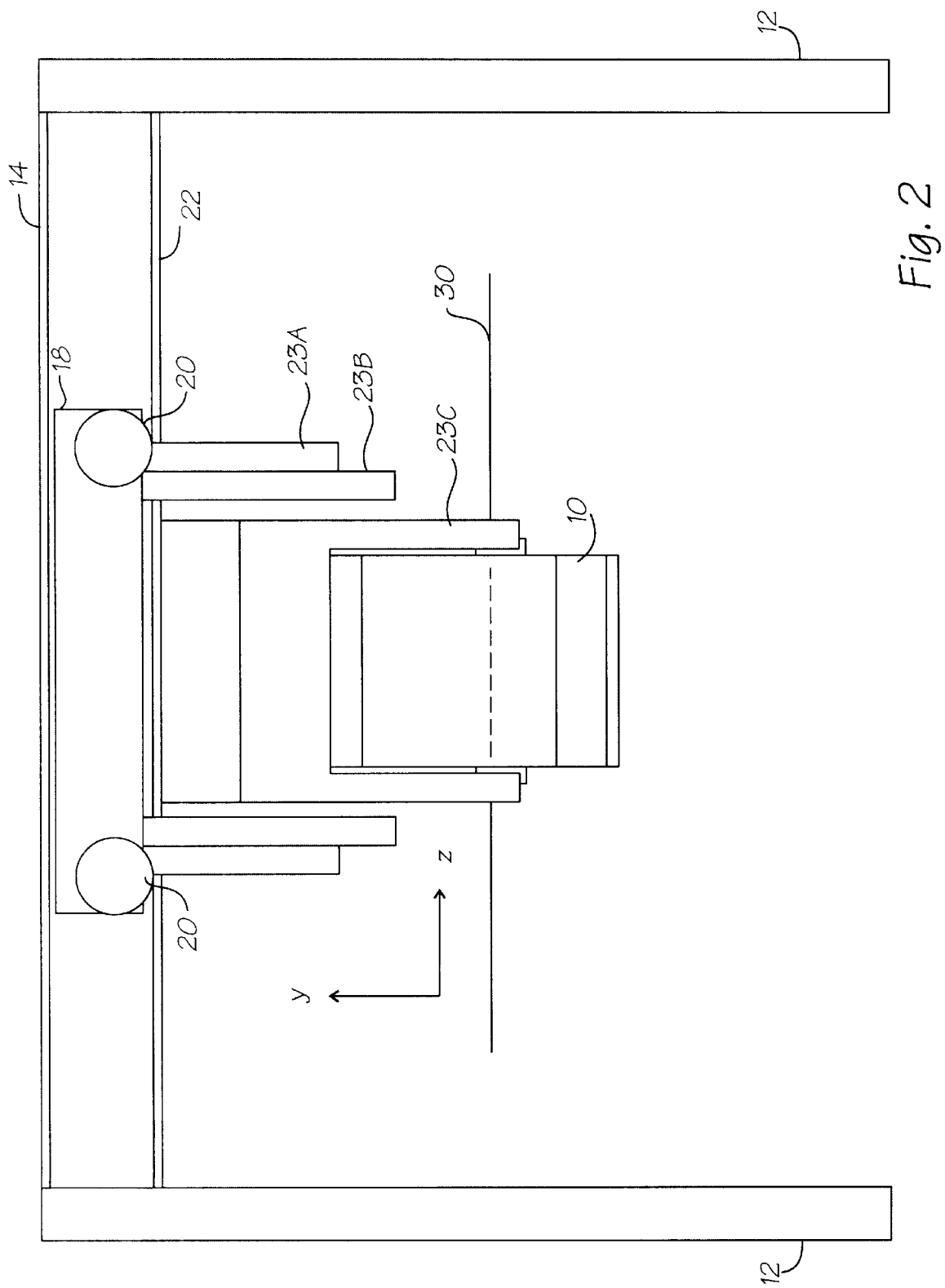

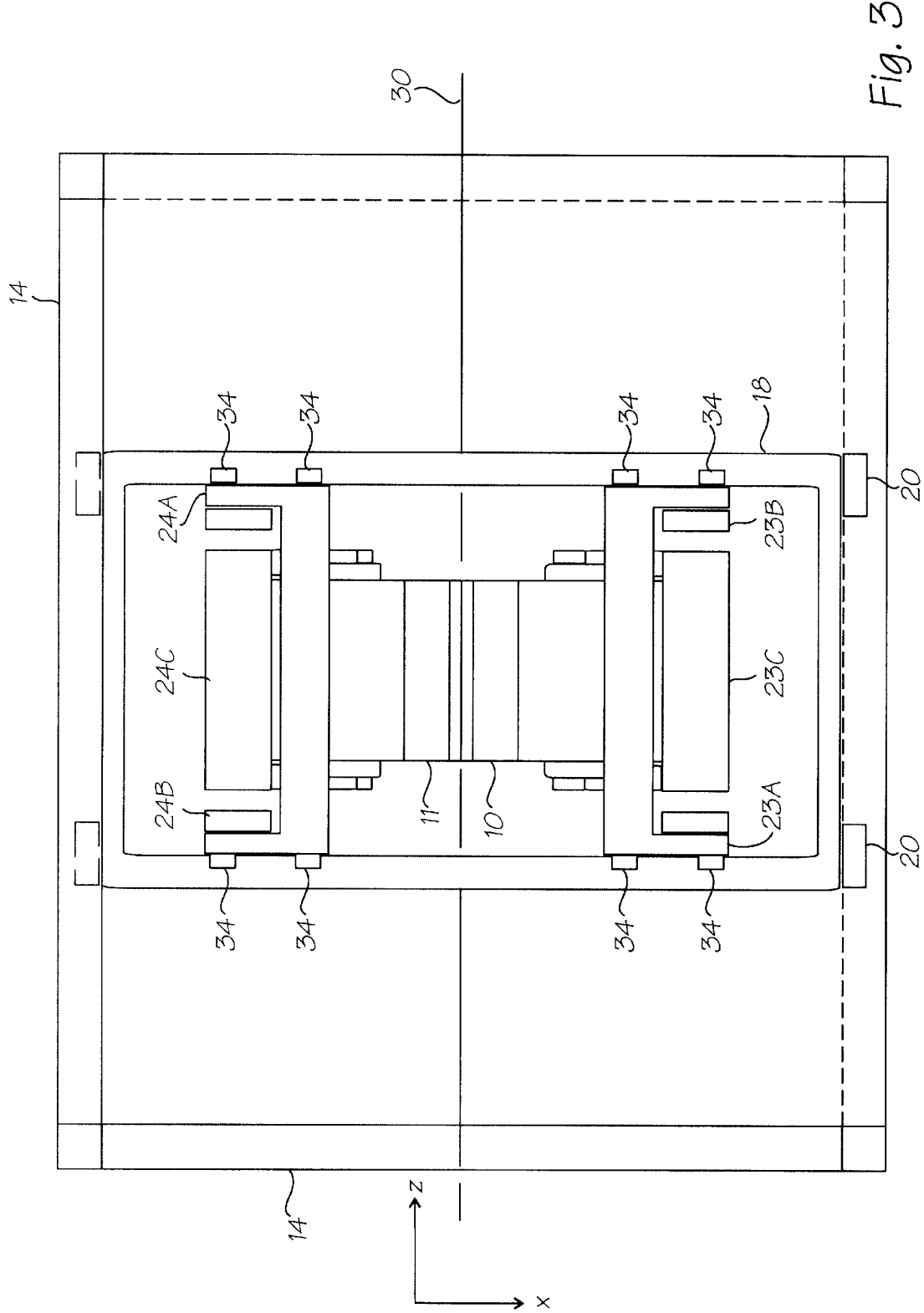

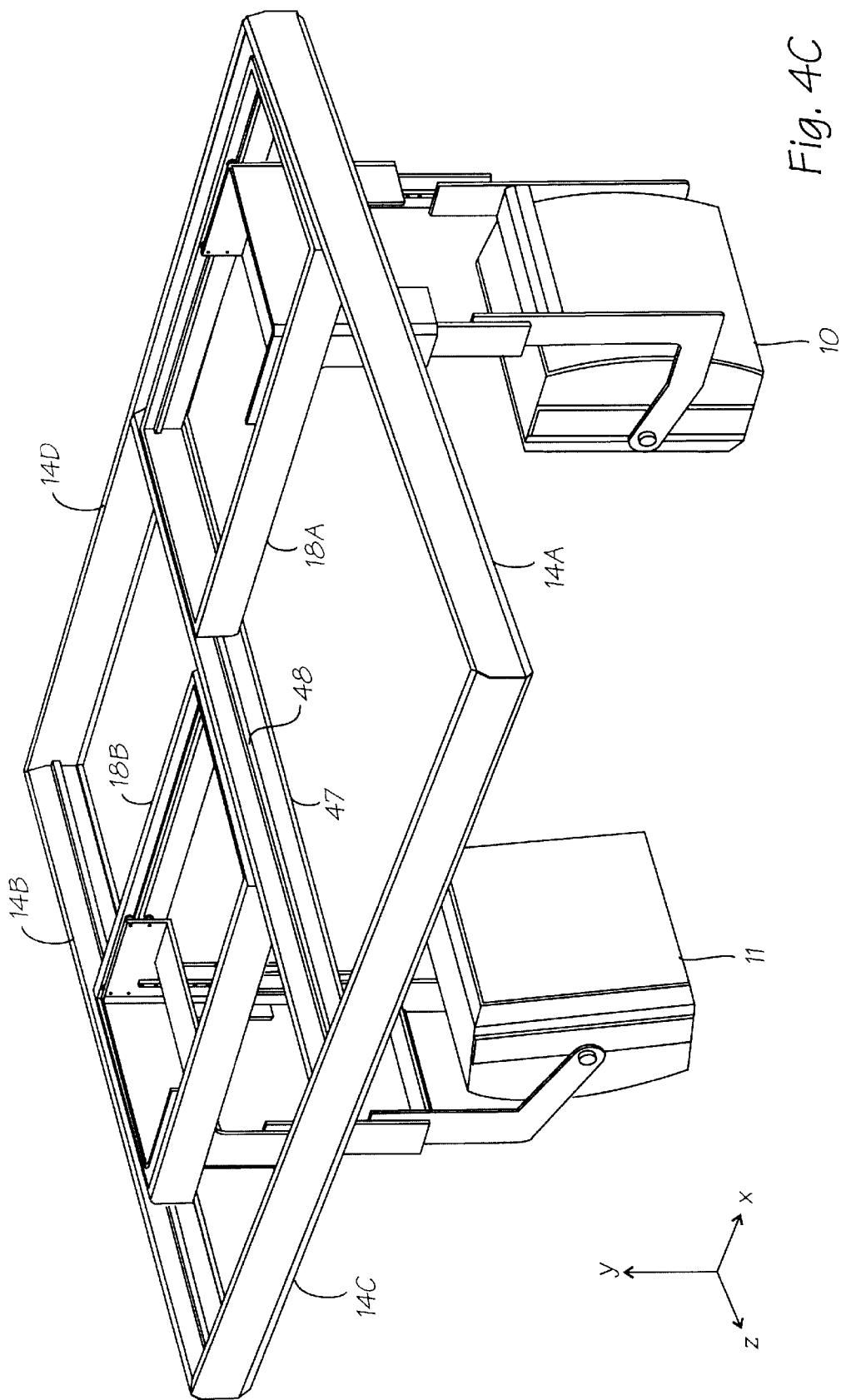

GANTRY FOR MEDICAL IMAGING SYSTEM

FIELD OF THE INVENTION

The present invention pertains to the field of medical imaging systems. More particularly, the present invention relates to support structures for medical imaging systems.

BACKGROUND OF THE INVENTION

Conventional nuclear medicine imaging systems include one or more gamma ray detectors supported by a gantry. The gantry typically provides mechanical movement of the detectors to allow the detectors to be positioned in various locations and orientations around the patient's body. Hence, image data can be acquired from various different angles about the patient. In conventional imaging systems, the gantry is a floor-mounted structure. In some systems, the gantry includes one or more closed, ring-shaped supports, to which the detectors are mounted. The detectors move in a circular path defined by the rings and are adjustable radially. The patient is placed within or next to the closed rings, and the rings are rotated with a motor to position the detectors appropriately about the patient.

Such systems have certain disadvantages. For example, because of their enclosed design, ring-based imaging systems and other enclosed systems tend to hinder studies of patients who are connected to intravenous lines and other life-supporting systems. For the same reason, such systems tend to be uncomfortable for claustrophobic patients. In particular, moving the patient through the rings may cause the patient anxiety. In addition, some such systems tend to be poorly suited for imaging wheelchair-bound patients and critically ill patients who cannot be moved from a hospital bed, or for imaging patients in either a sitting or standing position. These systems also tend to hinder the transfer of patients from a gurney to the imaging table, limit the attending technician's accessibility to the patient, and consume significant floor area.

SUMMARY OF THE INVENTION

A medical imaging system is provided which comprises a gantry and a radiation detector for acquiring image data of an object. The gantry suspends the detector from a position above the object and is configured to position the detector at a number of angular positions about an axis for acquisition of the image data. The gantry is such that the detector is suspended from above the object while the detector is positioned at each of the angular positions, and the angular positions include positions in which the detector is located substantially below the object.

In another embodiment, the medical imaging system comprises a first radiation detector and a support structure coupled to the radiation detector to support the first radiation detector. The support structure is capable of moving the first radiation detector in translation along each of multiple perpendicular axes, wherein one of the multiple perpendicular axes is a substantially vertical axis.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 1A and 1C illustrate a nuclear medicine imaging system including an overhead gantry.

FIG. 2 is a side view of the imaging system of FIG. 1A.

FIG. 3 is a top view of the imaging system of FIG. 1A.

FIG. 4C illustrates an overhead gantry having a separate z-carriage for each detector.

DETAILED DESCRIPTION

Figure 1B:
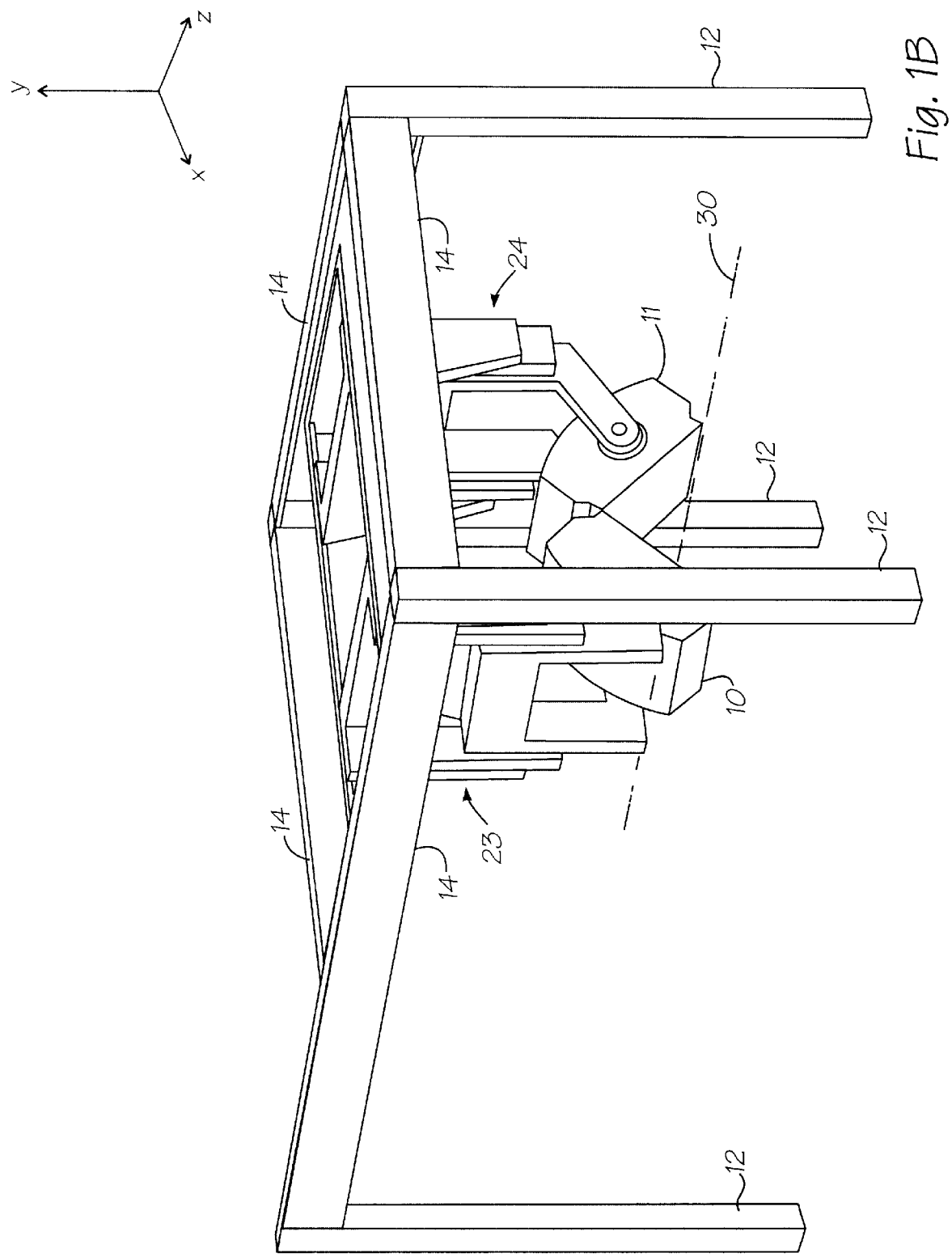
FIG. 1B shows an imaging system including an overhead gantry with extended support members to facilitate patient access.

A nuclear medicine imaging system is described which has an overhead gantry that provides three-axis linear and rotary detector motion. As will be described below, the present invention includes a nuclear medicine imaging system having an overhead gantry. In contrast with conventional floor-mounted imaging systems, a gantry according to one embodiment of the present invention suspends the gamma ray detectors from overhead, thereby providing easier access for bed-ridden patients, wheelchair-bound patients, and patients connected to life support systems, providing greater flexibility to image standing or sitting patients, and reducing floor obstructions. A gantry of the present invention also employs linear (translational) movements of the detectors to position the detectors at various angular positions about the patient, in contrast with conventional (e.g., ring-based) gantries, which use only curvilinear movements of the detectors for that purpose.

FIG. 1A illustrates a nuclear medicine imaging system having an overhead gantry in accordance with the present invention. The gantry is used to support and provide movement of two gamma ray detectors 10 and 11 for purposes of acquiring image data of a patient. During certain types of imaging studies, such as emission computed tomography (ECT), the detectors 10 and 11 are positioned at various different angular positions about a longitudinal axis 30, to acquire image data from different angles ("projection angles") about the patient's body. The longitudinal axis 30 ordinarily passes through the patient's body lengthwise and, for an ECT study, may be the center of rotation of the detectors 10 and 11. Movement and configuration of the gantry to position the detectors 10 and 11 are controlled by a computer system (not shown), as are the data acquisition and image reconstruction processes. The details of the controlling computer system are not germane to the present invention and are therefore not provided herein.

The overhead gantry of FIG. 1A includes four members (beams) 14, which are connected at their ends to generally form the shape of a rectangle. The beams 14 are supported in horizontal orientations off the floor at the corners of the rectangle by vertical columns 12. Preferably, the beams 14 are supported high enough off the floor so that a person of normal height can walk under them. Note that while the embodiment of FIG. 1A employs four vertical columns 12 to support the beams 14, other techniques may be used within the scope of the present invention to provide support. For example, the horizontal beams 14 may be mounted to the ceiling rather than supported from below. Further, a greater or fewer number of vertical columns 12 may be employed than that shown.

The gantry includes two support arms 23 and 24 suspended downward from overhead positions. Support arm 23 supports detector 10, while support arm 24 supports detector 11. As will be explained below, the support arms 23 and 24 allow detectors 10 and 11 to be moved in translation horizontally in both the x direction (perpendicular to the longitudinal axis 30) and the z direction (parallel to the longitudinal axis 30). Further, support arms 23 and 24 each can perform a "telescoping" action, i.e., can extend or retract in the y direction, to allow detectors 10 and 11 to be moved in translation vertically. Hence, each detector is always suspended by its support arm from above the patient, even though the detector itself may at times be located below the patient during an imaging session. Further, in contrast with conventional ring-based systems, the paths of motion of the detectors are independent of each other.

It may be desirable for the beams 14 to have different lengths to conform the dimensions of the gantry to the dimensions of the room in which it is to be located. Hence, each of the vertical columns 12 can be located against or near a wall to provide greater access to the patient and to otherwise facilitate movement of attending personnel, life support systems, and other equipment. Accordingly, FIG. 1B shows an embodiment of the overhead gantry similar to that shown in FIG. 1A, but in which one of the horizontal beams 14 has been extended in this manner.

Figure 1C:
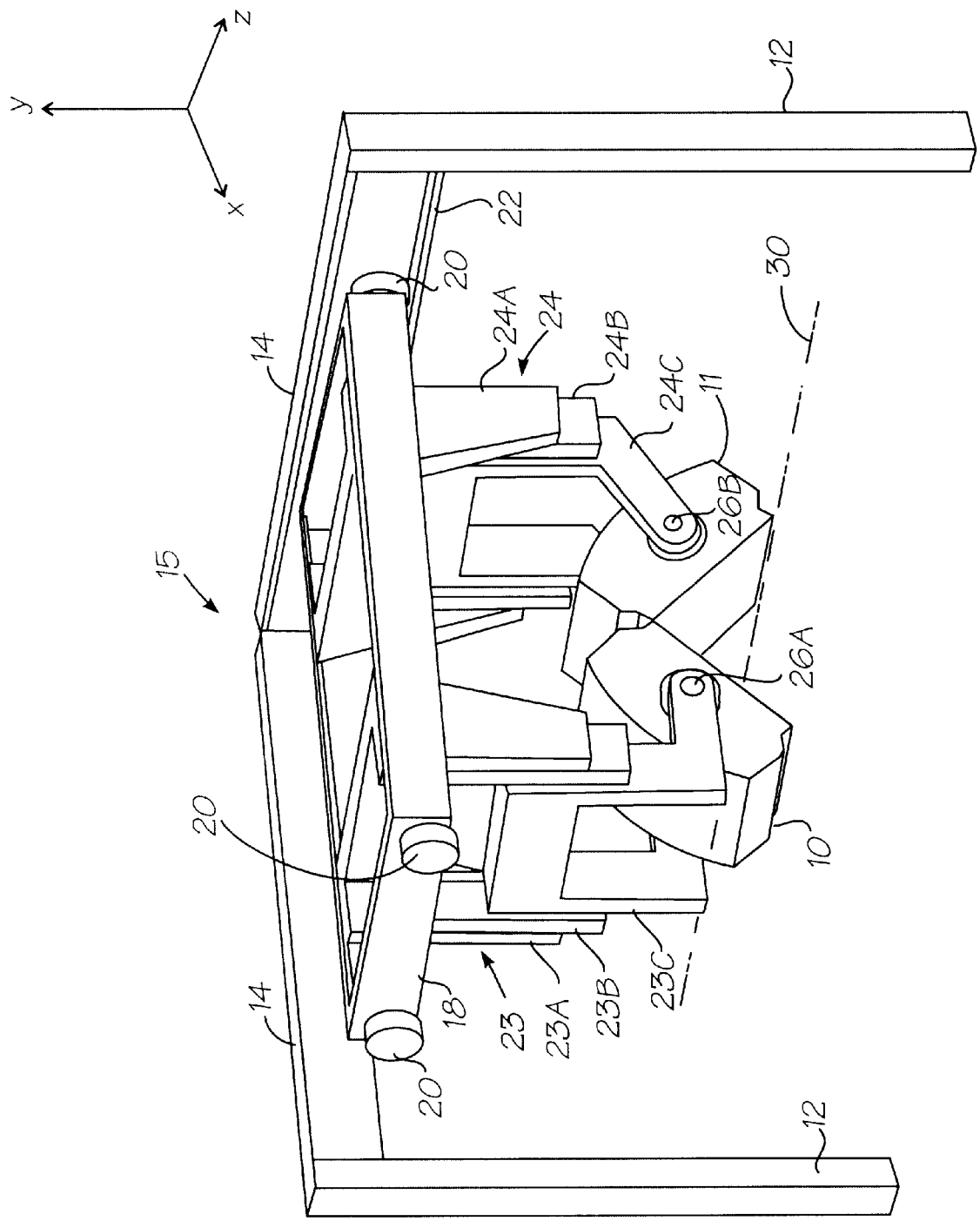

FIG. 1C shows a view of the imaging system of FIG. 1A in which certain beams 14 and columns 12 are not shown, to better illustrate other aspects of the gantry. FIGS. 2 and 3 show side and top views, respectively, of the imaging system of FIGS. 1A and 1C. Referring now to FIG. 1C, two of the beams 14, i.e., the beams which are parallel to the z axis, support a carriage (hereinafter the "z-carriage") 18 in an overhead position. The z-carriage 18 is movable in translation along the two beams 14 in the z direction. The two beams which support the z-carriage 18 each include a rail 22 supporting rollers 20 of the z-carriage 18.

The two support arms 23 and 24 are suspended downward from the z-carriage 18. Support arms 23 supports detector 10, while support arms 24 supports detector 11. Each of support arms 23 and 24 is coupled to the z-carriage 18 so as to be movable in translation in the x direction (perpendicular to the motion of the z-carriage 18). As shown in FIG. 3, each of support arms 23 and 24 may have rollers 34 to allow the support arms to slide along the z-carriage 18 in the x direction. Thus, the embodiment of FIG. 3 and other embodiments discussed herein provide linear detector motion independently along each of two perpendicular horizontal axes, i.e., the x and z axes. Note, however, that alternative embodiments may provide horizontal motion along only one horizontal axis and supplement such motion by moving the patient (i.e., moving the table) along the other horizontal axis.

Support arms 23 and 24 are retractably extendible in a vertical direction (parallel to the y axis). To provide this function, each support arm assembly includes three telescoping segments. Referring again to FIG. 1C, support arm 23 includes segments 23A, 23B and 23C. Segment 23A is coupled directly to the z-carriage 18 and is movable along the z-carriage 18 in the x direction. Segment 23B is mounted to segment 23A so as to be slidable vertically along segment 23A. Segment 23C is coupled to segment 23B so as to be slidable vertically along segment 23B. Segment 23C is a yoke to which detector 10 is coupled. Detector 10 is mounted to yoke 23C so as to be pivotable about an axis passing through point 26A parallel to the z axis.

Similarly, support arm 24 includes segments 24A, 24B and 24C. Segment 24A is coupled directly to the z-carriage 18 and is movable along the z-carriage 18 in the x direction. Segment 24B is mounted to segment 24A so as to be slidable vertically along segment 24A. Segment 24C is coupled to segment 24B so as to be slidable vertically along segment 24B. Segment 24C is a yoke to which detector 11 is coupled. Detector 11 is mounted to segment 24C so as to be pivotable about an axis passing through point 26B parallel to the z axis.

Thus, using combinations of translational movements, the overhead gantry described above can position the detectors 10 and 11 for various types of imaging studies, including ECT, caudal/cephalic, bed studies, etc. For purposes of an ECT study, for example, detectors 10 and 11 can be placed in various angular positions about the longitudinal axis 30 using linear (telescoping) movements of support arms 23 and 24 in the y direction in combination with linear movements of support arms 23 and 24 in the x direction and appropriate pivoting of detectors 10 and 11. Movement of the z-carriage 18 in the z direction can be used to position detectors 10 and 11 at various positions along the longitudinal axis 30.

Figure 4A:
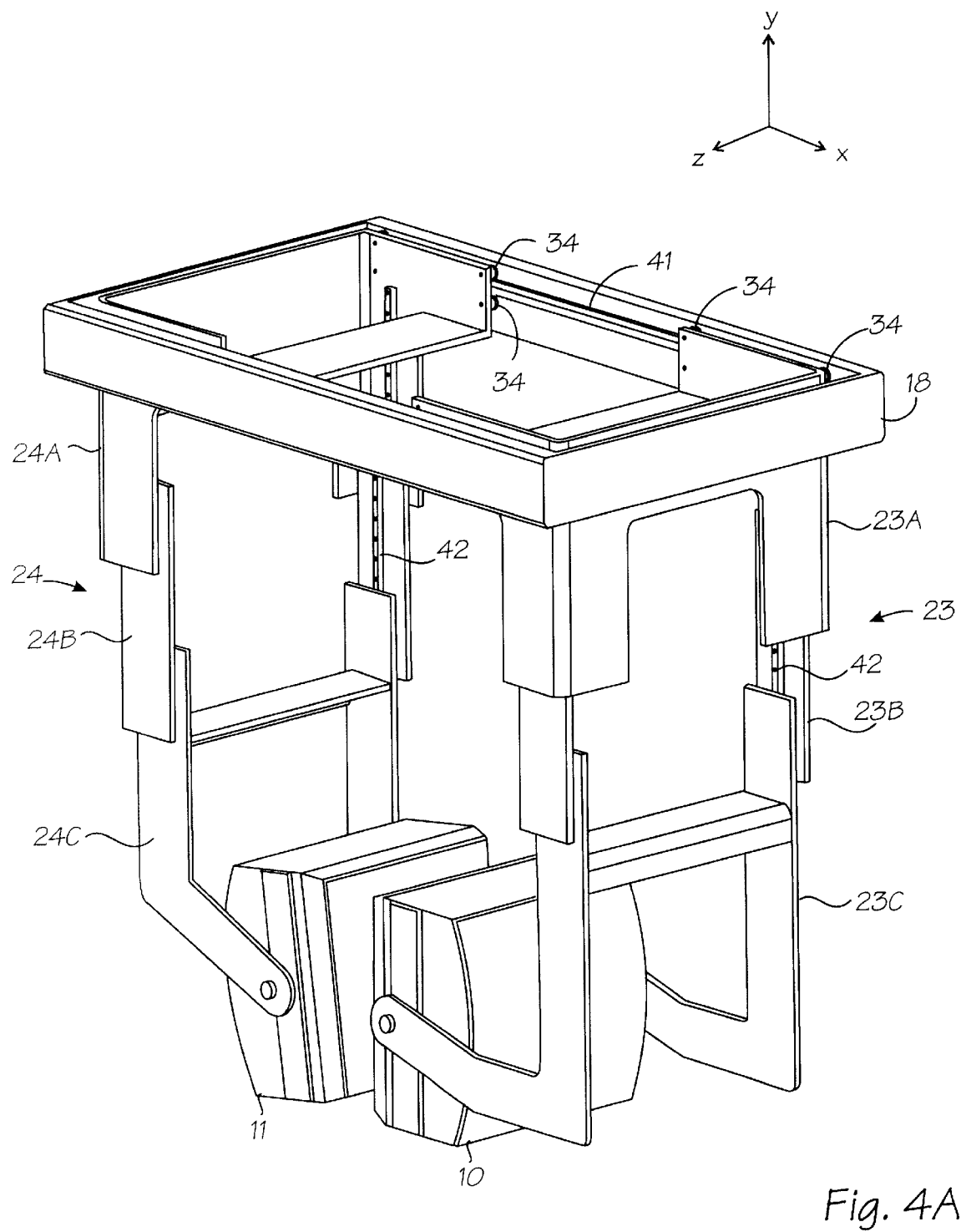
FIG. 4A illustrates carriage and support arm assemblies for an overhead gantry.

FIG. 4A illustrates the carriage and support arms 23 and 24 in greater detail, according to one embodiment. In the illustrated embodiment, the z-carriage 18 includes rails 41, along which rollers 34 of support arms 23 and 24 roll, to allow movement of the support arms in the x direction. Similarly, support arms 23 and 24 include rails 42 to allow vertical motion of the individual arm segments. Note that other types of mechanical interfaces may be implemented between arm segments and between the support arms and the z-carriage 18, at the discretion of the designer, to provide the above-described linear movements.

Figure 4B:
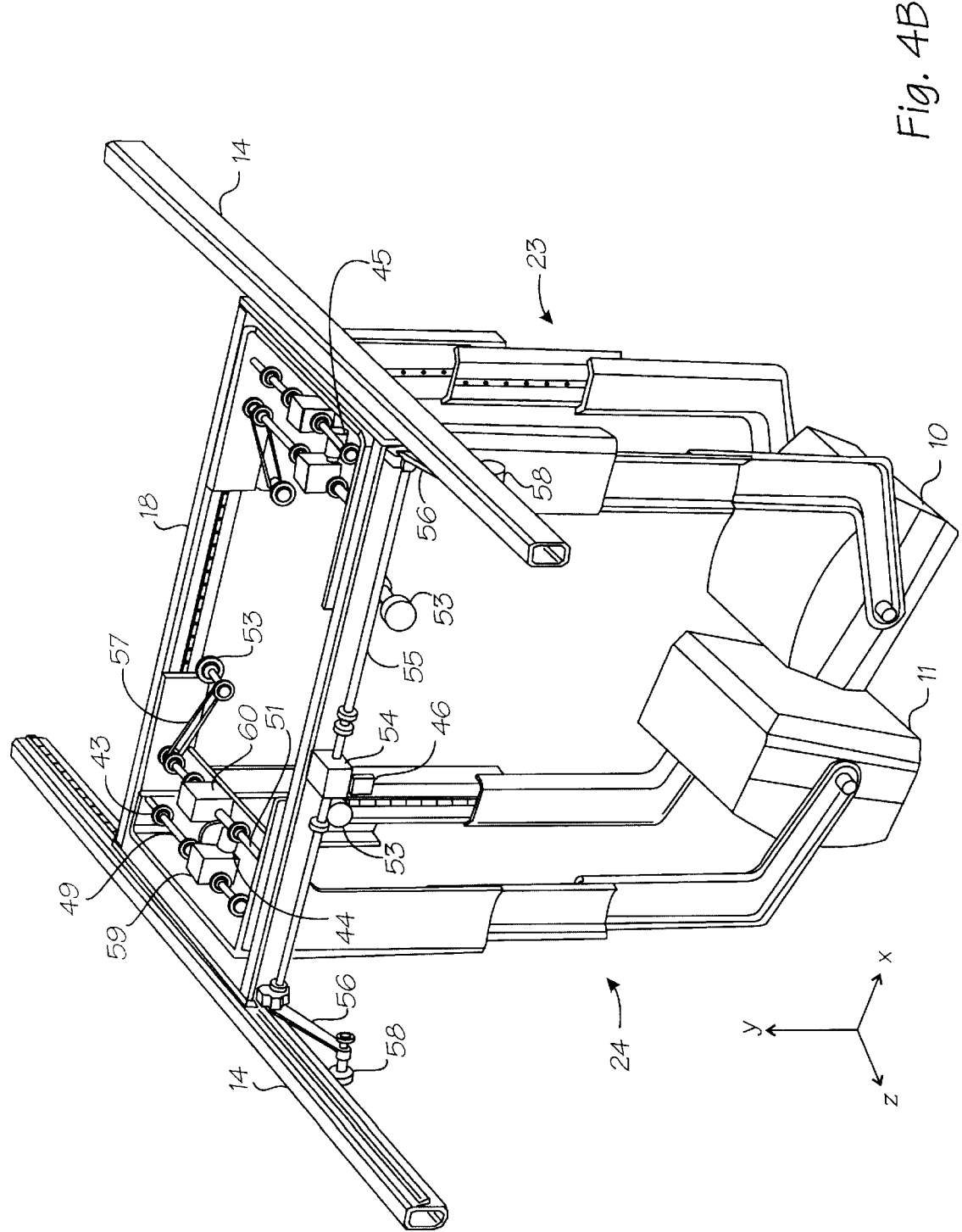
FIG. 4B shows the drive components for an overhead gantry.

FIG. 4B shows the drive components for the overhead gantry of FIG. 4A, according to one embodiment. For each of support arms 23 and 24, a motor 44 drives the vertical telescoping motion of the support arm through a gear box 59, a drive shaft 49, and sprockets 43, which operate lift chains (not shown). Another motor 45 drives the support arm in the x direction along the z carriage through a gear box 60, a drive shaft 51, a belt and pulley assembly 57, and drive gears 53 in contact with the z-carriage 18. Motor 46 drives the z-carriage 18 in the z direction along beams 14 through gear box 54, drive shaft 55, belt and pulley assemblies 56, and drive gears 58 in contact with the beams 14. It will be recognized that many other implementations of the drive components are possible.

FIG. 4C illustrates another embodiment of the overhead gantry which allows each of the detectors 10 and 11 to be moved independently along all three coordinate axes. Specifically, the gantry of FIG. 4C includes two z-carriages, one for each detector. Detector 10 is suspended from z-carriage 18A, while detector 11 is suspended from z-carriage 18B. A center beam 47 is aligned with the z axis and is coupled to horizontal beams 14C and 14D between beams 14A and 14B. Z-carriage 18A is mounted between the center beam 47 and beam 14A and is movable in translation along a rail 48 or other appropriate interface on the center beam 47 and on beam 14A. Similarly, z-carriage 18B is mounted between the center beam 47 and beam 14B and is movable along a rail or other appropriate interface on the center beam 47 and on beam 14B. Thus, with the embodiment of FIG. 4C, movement of each detector can be controlled in all three coordinate axes independently of movement of the other detector.

Figure 4D:
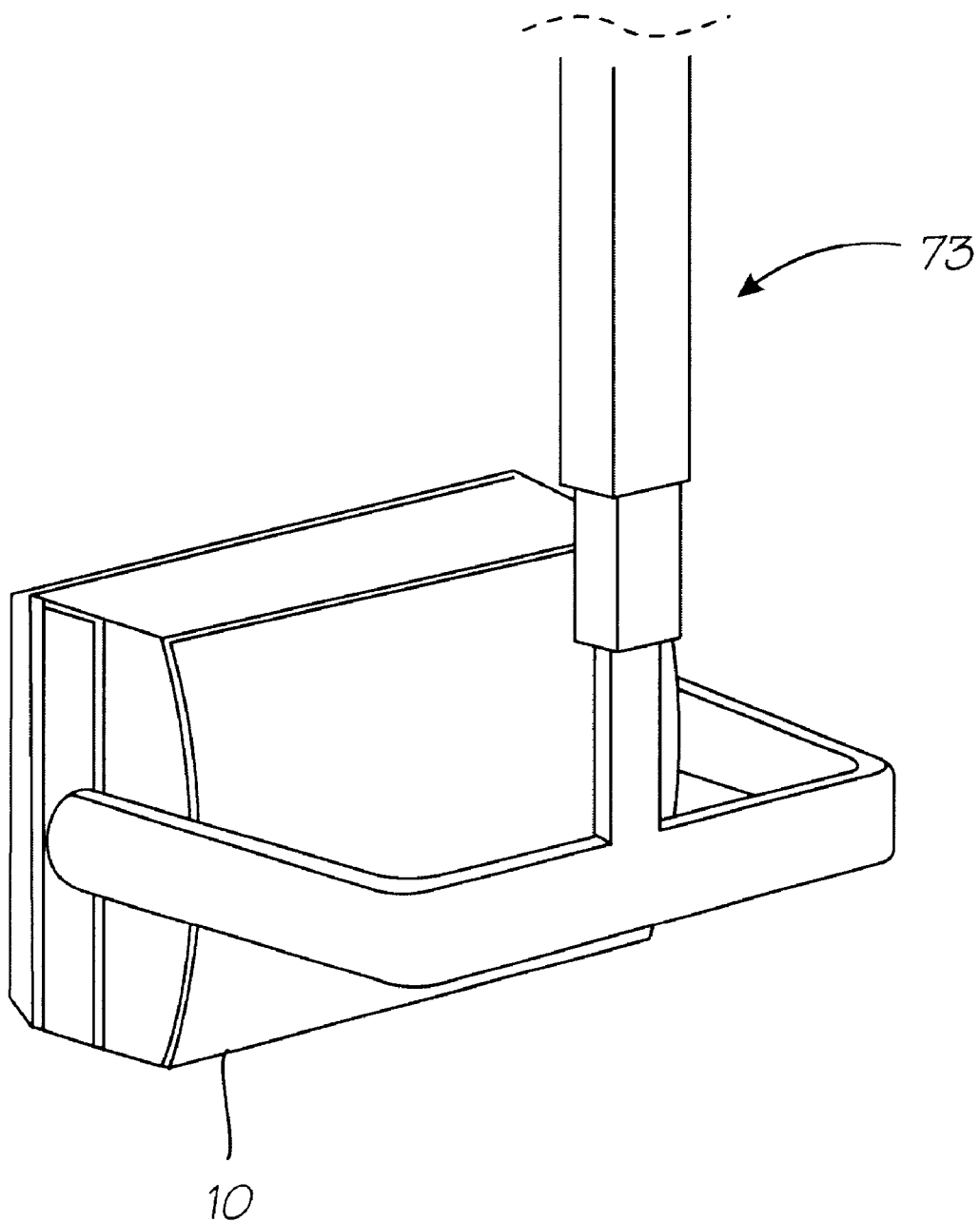
FIG. 4D shows a detector suspended by a single-strut telescoping support arm.
Figure 4E:
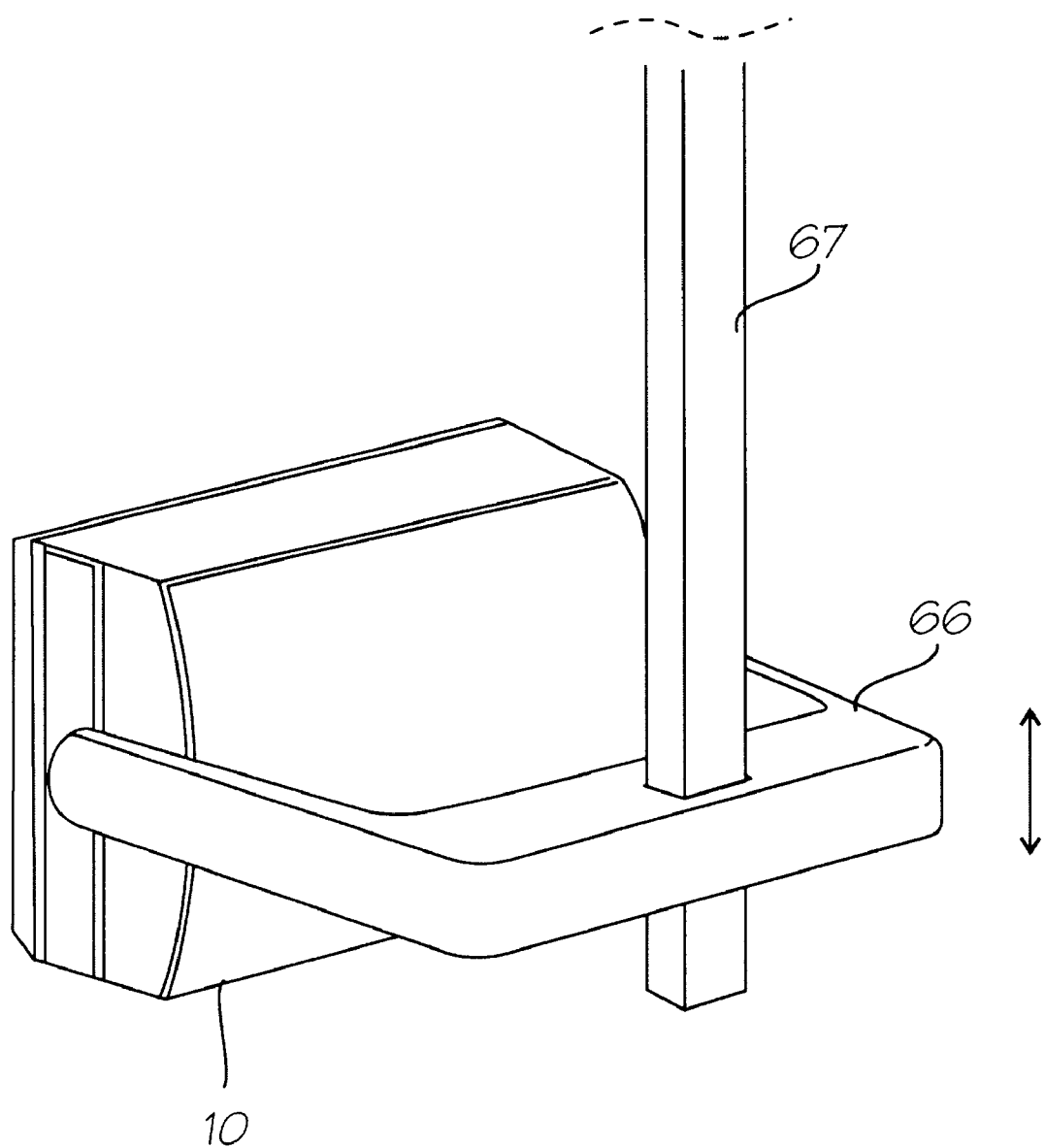
FIG. 4E shows a detector coupled to a yoke that is movable vertically along a support arm.

It should be noted that the support arms 23 and 24 also may have embodiments other than those shown in the Figures discussed above. One alternative embodiment is illustrated in FIG. 4D, for example, which shows a detector 10 suspended from a single-strut telescoping support arm 73, rather than a dual-strut support arm. FIG. 4E shows yet another embodiment which illustrates that vertical motion of the detector need not be provided by a telescoping support arm. Specifically, in the embodiment of FIG. 4E, the yoke 66 to which the detector 10 is coupled is moveable vertically along a non-telescoping (i.e., vertically fixed) support arm 67.

Figure 5:
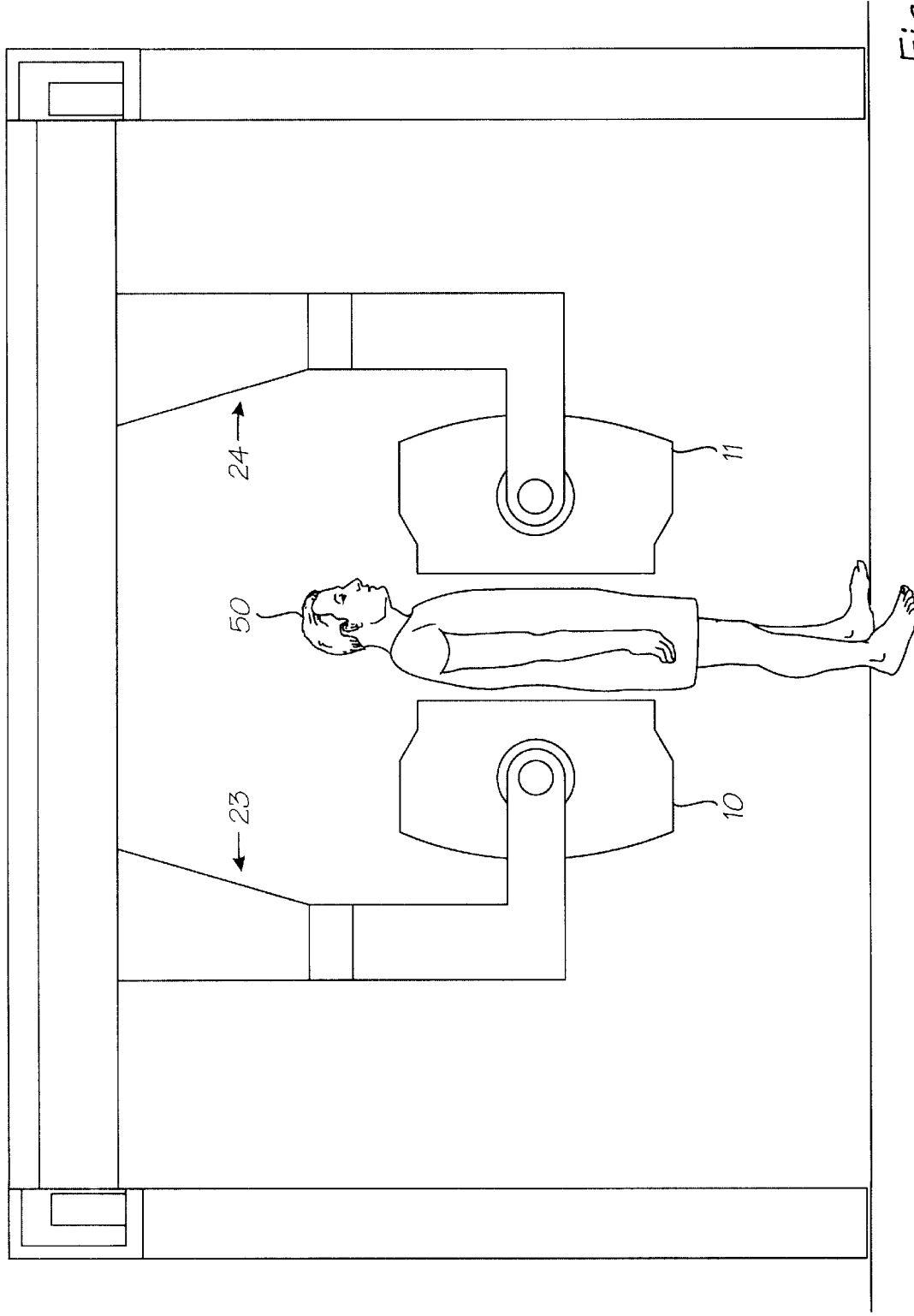
FIG. 5 illustrates an imaging system with an overhead gantry configured for imaging a standing patient.

As noted above, the overhead gantry of the present invention provides greater flexibility than conventional systems in positioning the detectors. FIG. 5, for example, illustrates how the overhead gantry can be configured to acquire anterior and posterior images of a standing patient 50. Note that the overhead gantry described herein imposes virtually no height restriction for imaging a standing patient, in contrast with many prior art systems. Detectors 10 and 11 are positioned facing each other with their imaging surfaces oriented vertically, and the patient 50 is positioned between the detectors 10 and 11. A similar configuration can be used to acquire images of a sitting patient. The detectors 10 and 11 can be moved up or down using the telescoping capability of support arms 23 and 24. Note that conventional nuclear medicine imaging systems generally provide little or no capability to move the detectors vertically. Such systems typically rely upon vertical motion of the table which supports the patient, which usually has a limited range of motion. This limitation can make it difficult or impossible to image patients in a standing or sitting position. The telescoping support arms 23 and 24 of the present invention, however, provide a much larger range of vertical motion for the detectors than many conventional systems.

Figure 6:
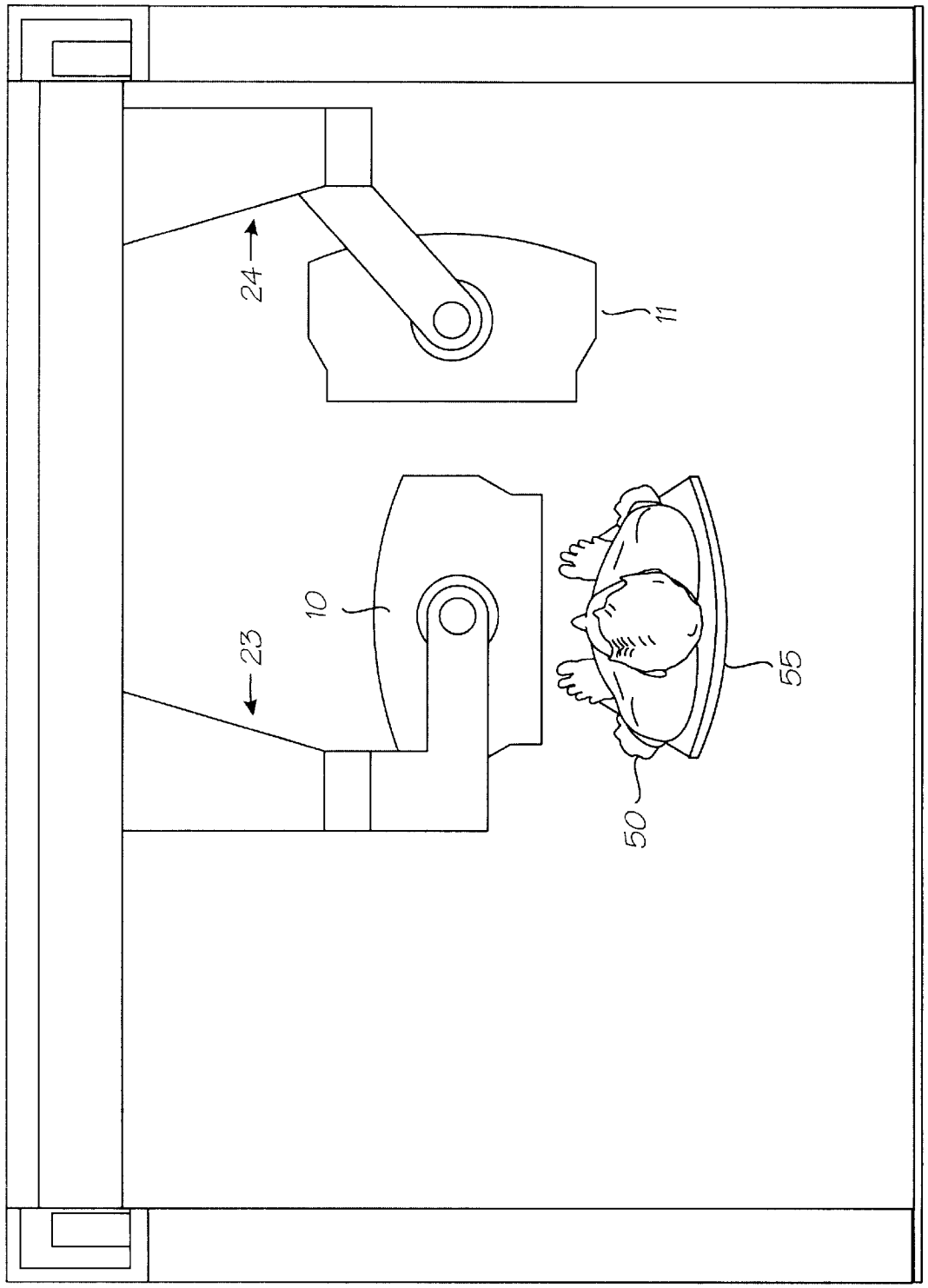
FIG. 6 illustrates an imaging system with an overhead gantry configured for imaging a patient confined to a bed.

FIG. 6 illustrates how the overhead gantry of the present invention can be used to acquire images of a patient confined to a hospital bed. The patient 50 remains in the bed 55, and the overhead design of the gantry provides ample floor space to allow the bed 50 to be simply rolled into position under the gantry. As shown, one or both of the detectors can be positioned directly above the patient with its imaging surface facing the patient. Intravenous lines and other life support systems can be left in place during the imaging session. If one of the detectors is not used, its support arm can be retracted so that the unused detector does not hinder access to the patient or otherwise become an obstacle.

Figure 7:
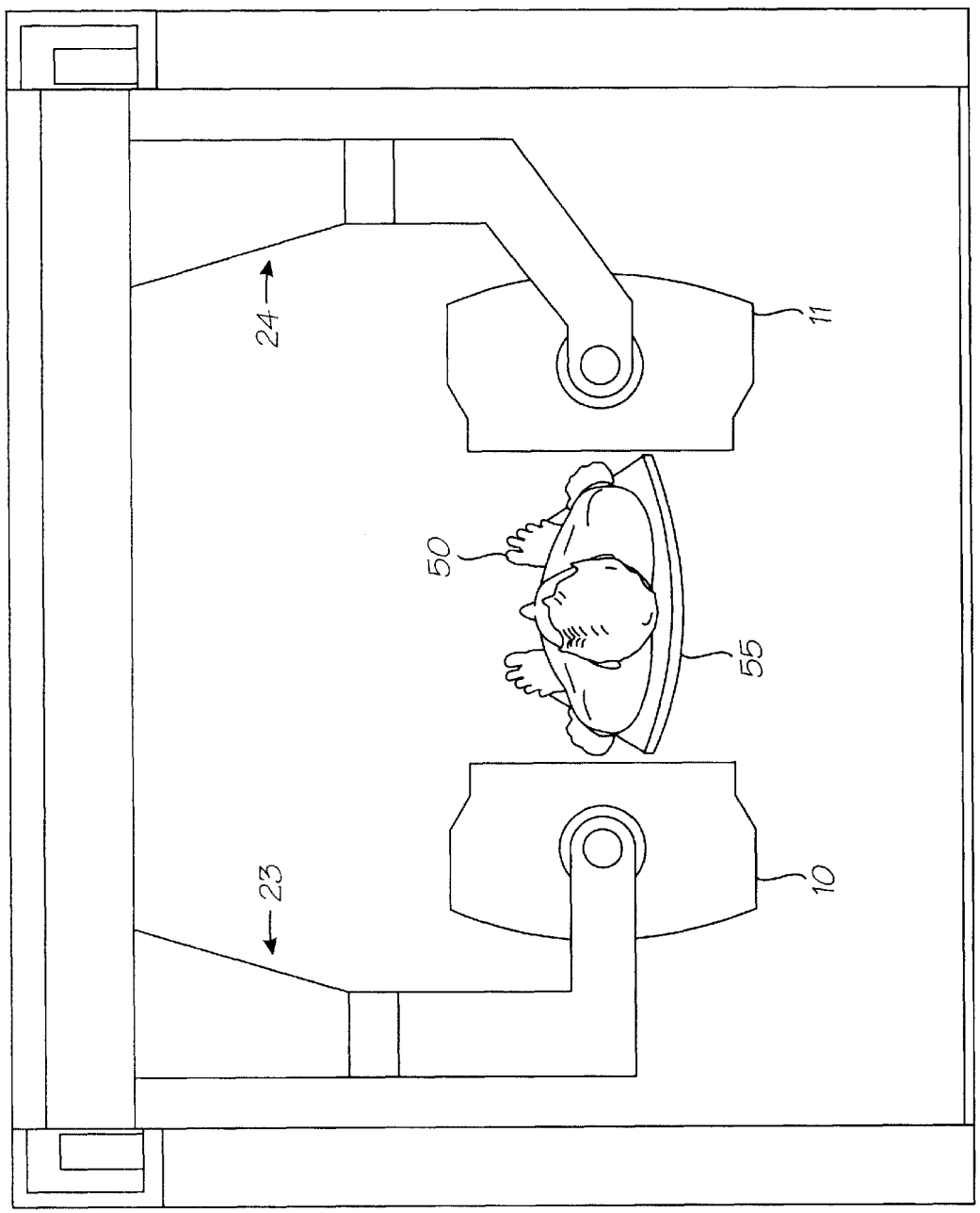
FIGS. 7 and 8 illustrate configurations of an imaging system with an overhead gantry for performing emission computed tomography (ECT) studies.
Figure 8:
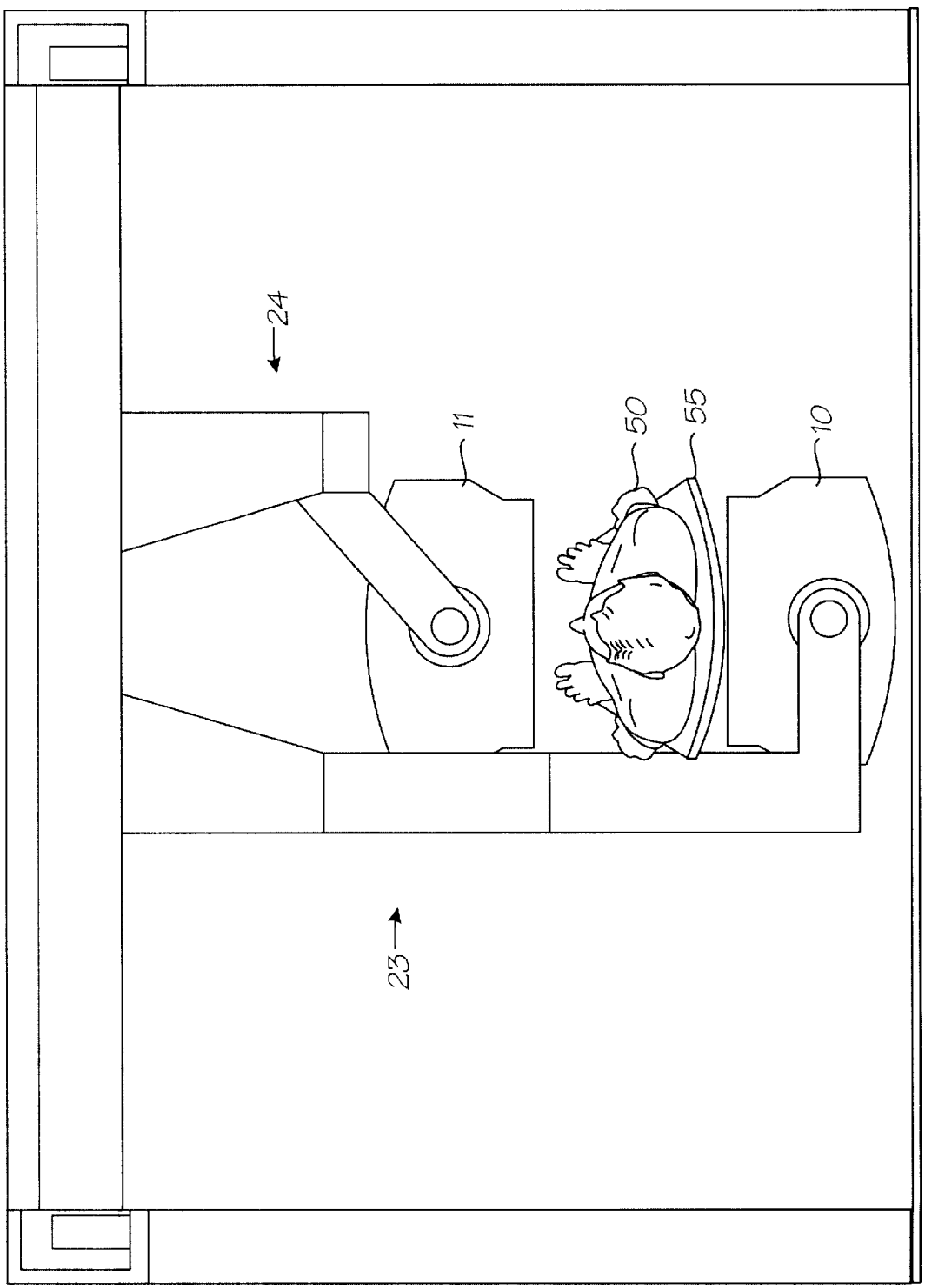

FIGS. 7 and 8 illustrate two configurations of the detectors 10 and 11 that may be used for ECT imaging. FIG. 7 shows detectors 10 and 11 positioned on either side of the patient 50 with their imaging surfaces facing each other and oriented vertically. FIG. 8 shows detector 10 positioned directly below the patient 50 with its imaging surface horizontal and facing up, and detector 11 positioned directly above the patient with its imaging surface horizontal facing down. In FIG. 8, support arm 23 is mostly extended, while support arm 24 is mostly retracted.

Figure 9:
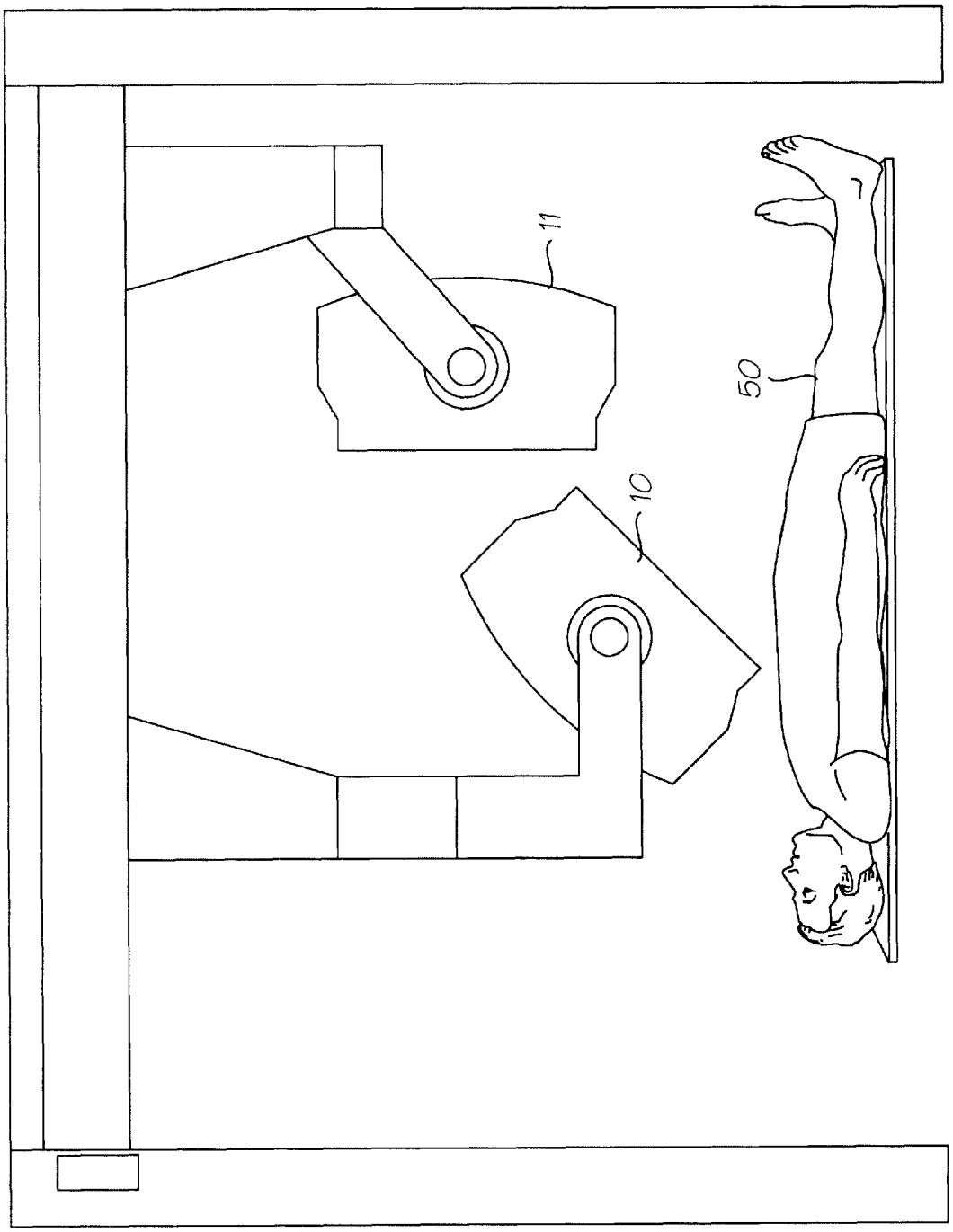
FIG. 9 illustrates an imaging system with an overhead gantry configured for performing cephalic or caudal studies.

FIG. 9 illustrates how the overhead gantry may be configured to perform either cephalic or caudal imaging. Detector 10 is positioned above the patient 50 with its imaging surface facing generally down but oriented at an acute angle from horizontal.

Figure 10:
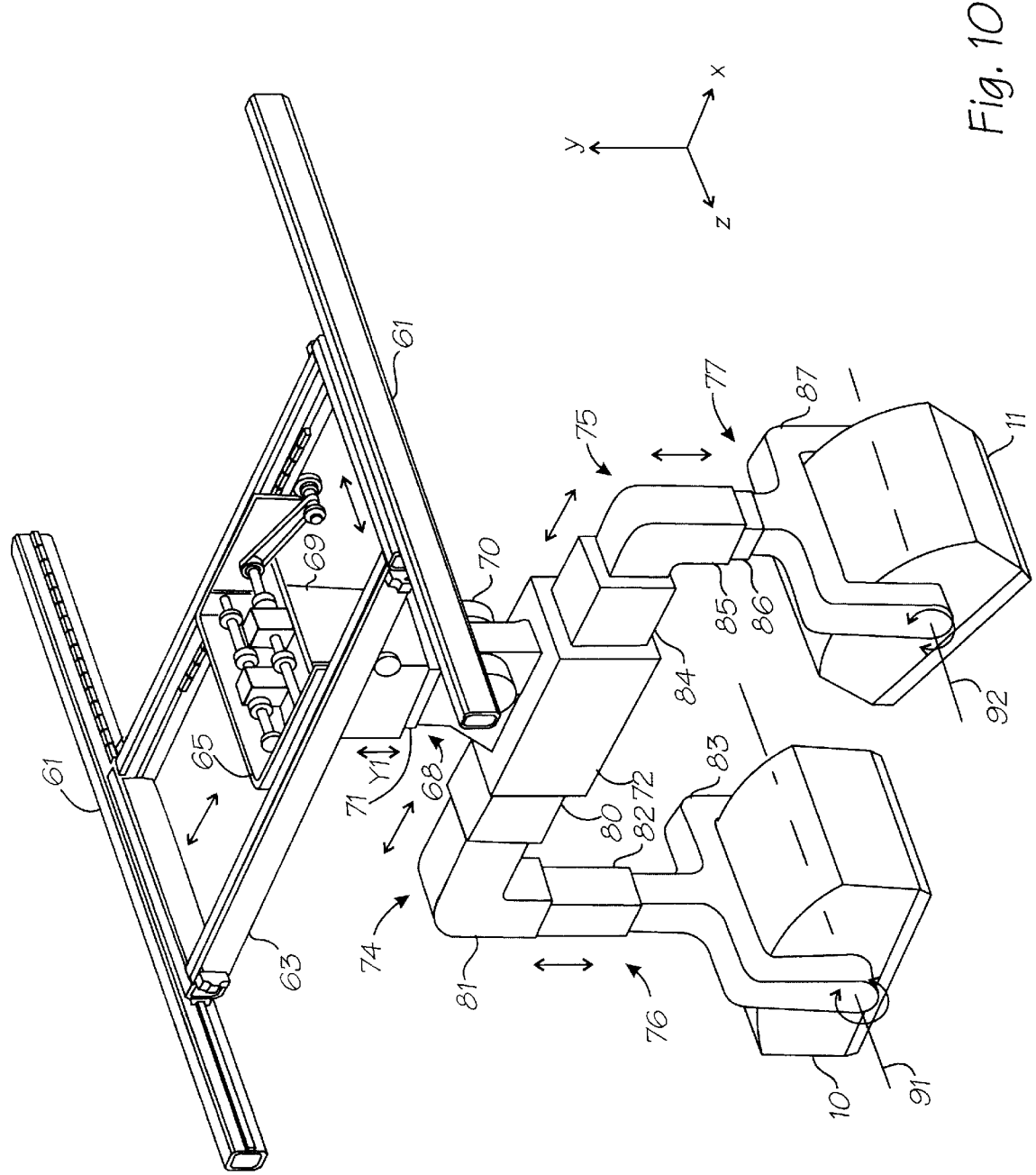
FIG. 10 illustrates an imaging system with an overhead gantry according to an embodiment which uses a single support arm to support both detectors.

FIG. 10 illustrates an alternative embodiment of an overhead gantry. Both detectors 10 and 11 are suspended from a single support arm, which generally has the shape of an inverted letter "Y". The z-carriage 63 is movable in translation in the z direction along rails 61, as in the embodiment of FIG. 1A. Rails 61 may be supported overhead using vertical beams, as in FIG. 1A, by mounting them to the ceiling, or by using any other suitable technique. A second carriage (hereinafter "x-carriage") 65 is coupled to z-carriage 63 and is movable in translation in the x direction along the z-carriage 63. The detectors 10 and 11 are suspended from the support arm, which is coupled to x-carriage 65.

The support arm includes vertical portions 68, 76 and 77, and horizontal portions 74 and 75. Vertical portion 68 is coupled to, and suspended downward from, x-carriage 65. Vertical portion 68 includes a first segment 69 coupled to x-carriage 65, a second segment 61 slidably coupled to segment 69, and a hub 70 slidably coupled to segment 71. Thus, segments 69, 71, and hub 70 cooperate to provide a telescoping action of vertical segment 68 in the y (vertical) direction. Horizontal segments 74 and 75 each are coupled to vertical segment 68 at hub 70. Hub 70 provides a pivoting action about an axis passing through it parallel to the z axis; consequently, the entire support arm assembly with the detectors can be pivoted about that axis. Coupled to hub 70 is a segment 72, which is shared by horizontal segments 74 and 75. Thus, horizontal segment 74 includes segment 72, as well as segments 80 and 81. Horizontal segment 75 includes segment 72, 84 and 85. Segment 80 is slidably coupled to segment 72, and segment 81 is slidably coupled to segment 80, to provide a telescoping action of horizontal segment 74 in the x direction. Similarly, segment 84 is slidably coupled to segment 72, and segment 85 is slidably coupled to segment 84, to provide a telescoping action of horizontal segment 75 in the x direction. Hence, horizontal segments 74 and 75 are each retractably extendible in the x direction.

Segments 81 and 85 are elbow-shaped segments, which couple horizontal segments 74 and 75 to vertical segments 76 and 77, respectively. Vertical segment 76 includes segment 82 and yoke 83. Yoke 83 is coupled to detector 10.

Segment 82 is slidably coupled to segment 81, and yoke 83 is slidably coupled to segment 82, to allow vertical telescoping action of vertical segment 76. Similarly, vertical segment 77 includes segment 86 and yoke 87. Yoke 87 is coupled to detector 11. Segment 86 is slidably coupled to segment 85, and yoke 87 is slidably coupled to segment 86, to allow vertical telescoping action of vertical segment 77. Yoke 83 allows detector 10 to be pivoted about axis 91, while yoke 87 allows detector 11 to be pivoted about axis 92, each parallel to the z axis.

Figure 11A:
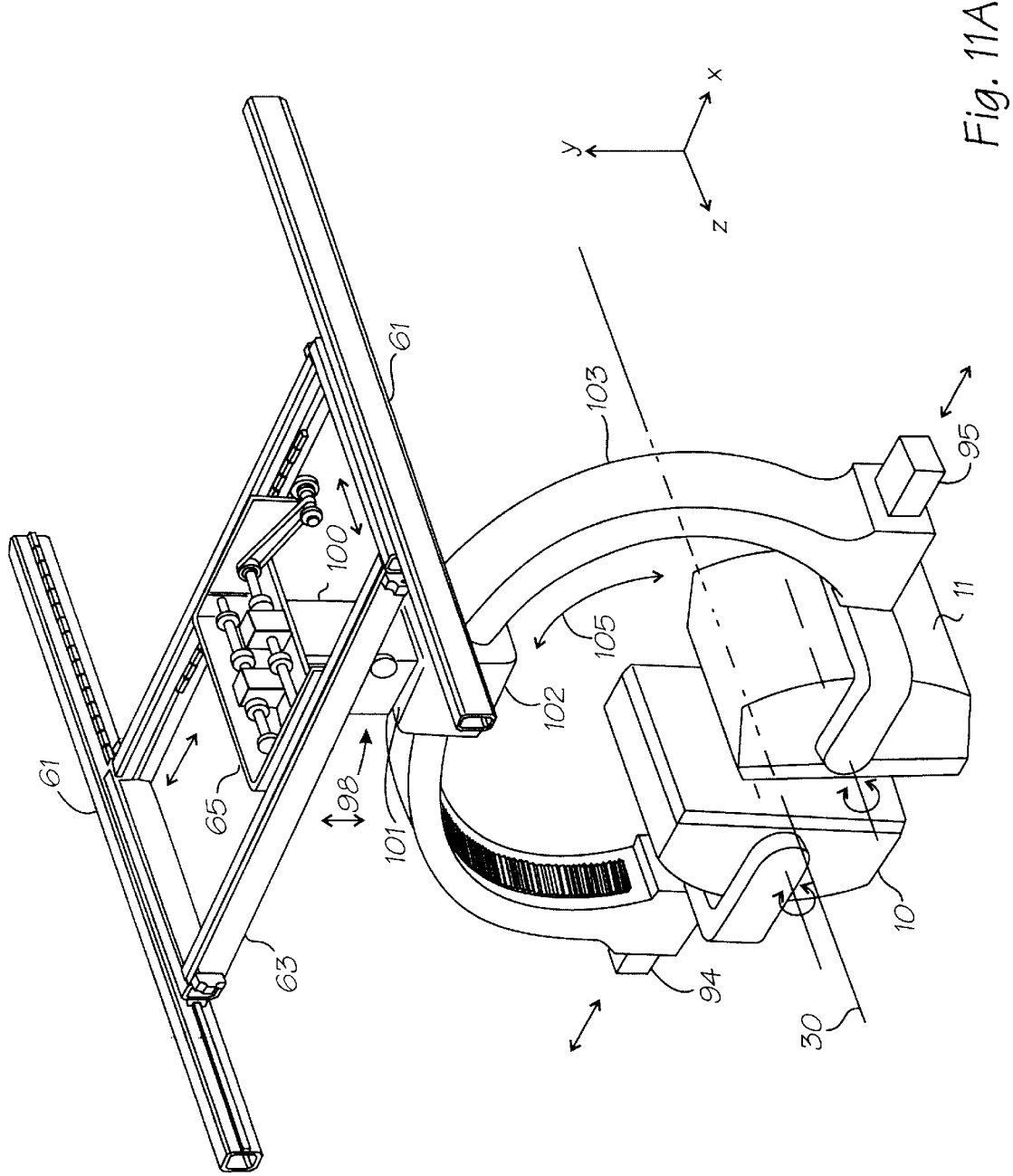
FIG. 11A illustrates an imaging system with an overhead gantry according to an embodiment which uses a ring-shaped support.

FIG. 11A shows another embodiment of an overhead gantry, which includes a ring-shaped support. The embodiment of FIG. 11A uses a combination of linear detector motion and curvilinear detector motion to vary the angular positions of the detectors 10 and 11 about the longitudinal axis 30. The embodiment of FIG. 11A includes a z-carriage 63 coupled to rails 61 and an x-carriage 65 coupled to z-carriage 63, as in the embodiment of FIG. 10. Suspended downward from x-carriage 65 is a vertical segment 98. Vertical segment 98 includes segment 100 coupled to x-carriage 65, segment 101 slidably coupled to segment 100, and segment 102 coupled to segment 101. Segments 100 and 101 cooperate to allow vertical telescoping action of vertical segment 98.

Ring support 103 is slidably coupled to segment 102. As shown, ring support 103 is generally circular and is shaped like a letter "C". Ring support 103 is coupled to segment 102 to allow rotation movement of ring support 103 along a curvilinear path 105. The longitudinal axis 30 may be the center of rotation. Detector 10 is coupled to a yoke 94, which is coupled to one end of the ring support 103. Detector 11 is coupled to a yoke 95, which is coupled to another end of ring support 103. Yokes 94 and 95 are slidably coupled to ring support 103 so as to allow linear motion of detectors 10 and 11, respectively, in the x direction.

Figure 11B:
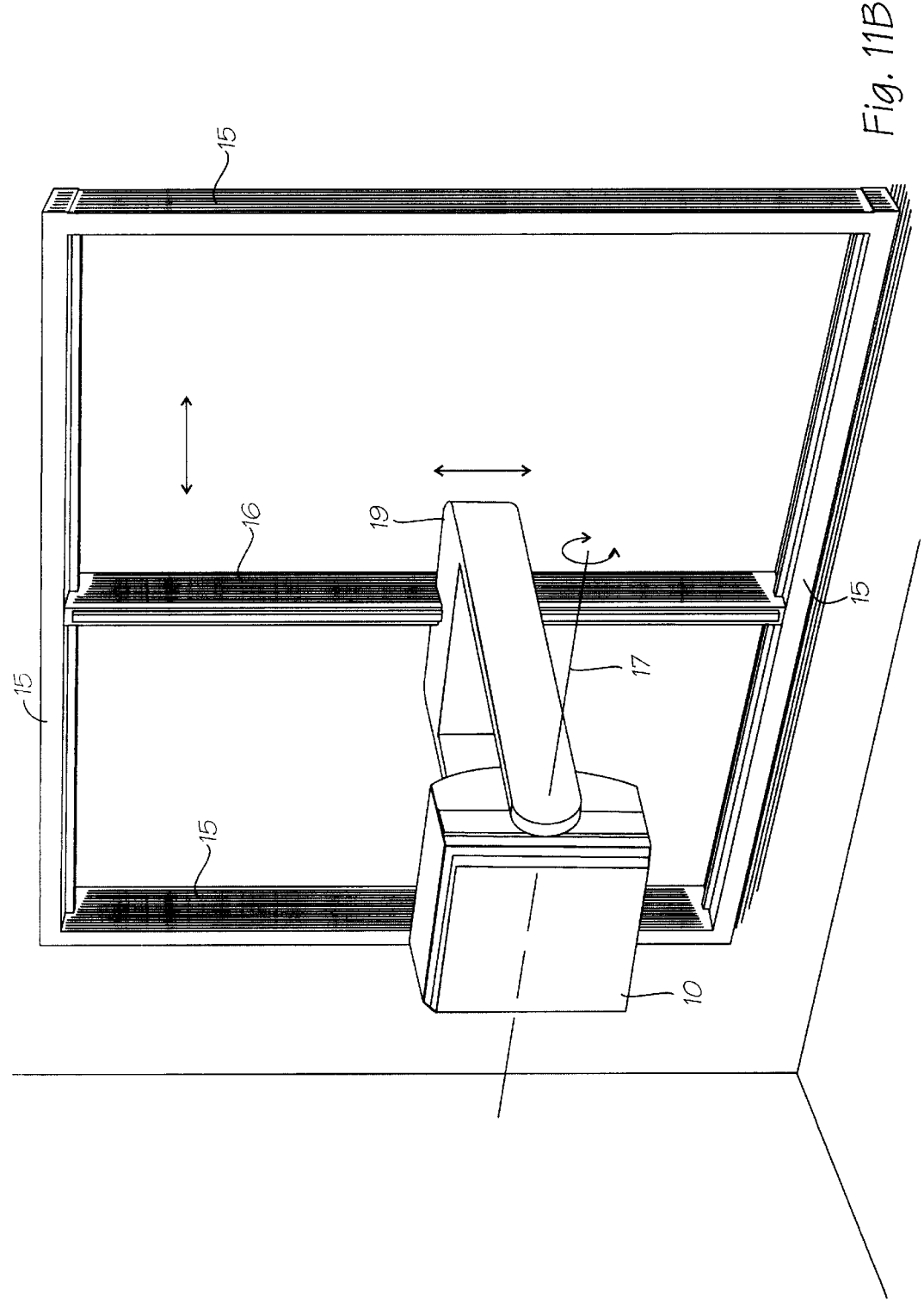
FIG. 11B shows a wall-mounted gantry which provides two-axis linear and rotary detector motion.

FIG. 11B illustrates another embodiment of the present invention, which includes a wall-mounted gantry. The wall-mounted gantry includes four members (beams) 15 connected at their ends to form a frame having the shape of a rectangle. The beams are mounted to the wall in a vertical orientation, as shown. A sliding member (beam) 16 is coupled to the two horizontal beams in a vertical orientation and is movable in translation horizontally along rails or other appropriate interface on the two horizontal beams. The support arm in this embodiment consists of a yoke 19, which supports the detector 10 is coupled to beam 16 and is movable vertically along a rail or other interface on beam 16. Yoke 19 can be locked in a given vertical position. The yoke 19 also allows the detector 10 to be pivoted about a horizontal axis 17. Note that the wall-mounted gantry may be equipped with a telescoping support arm or other appropriate means for moving the detector 10 in translation horizontally toward or away from the wall.

Figure 11C:
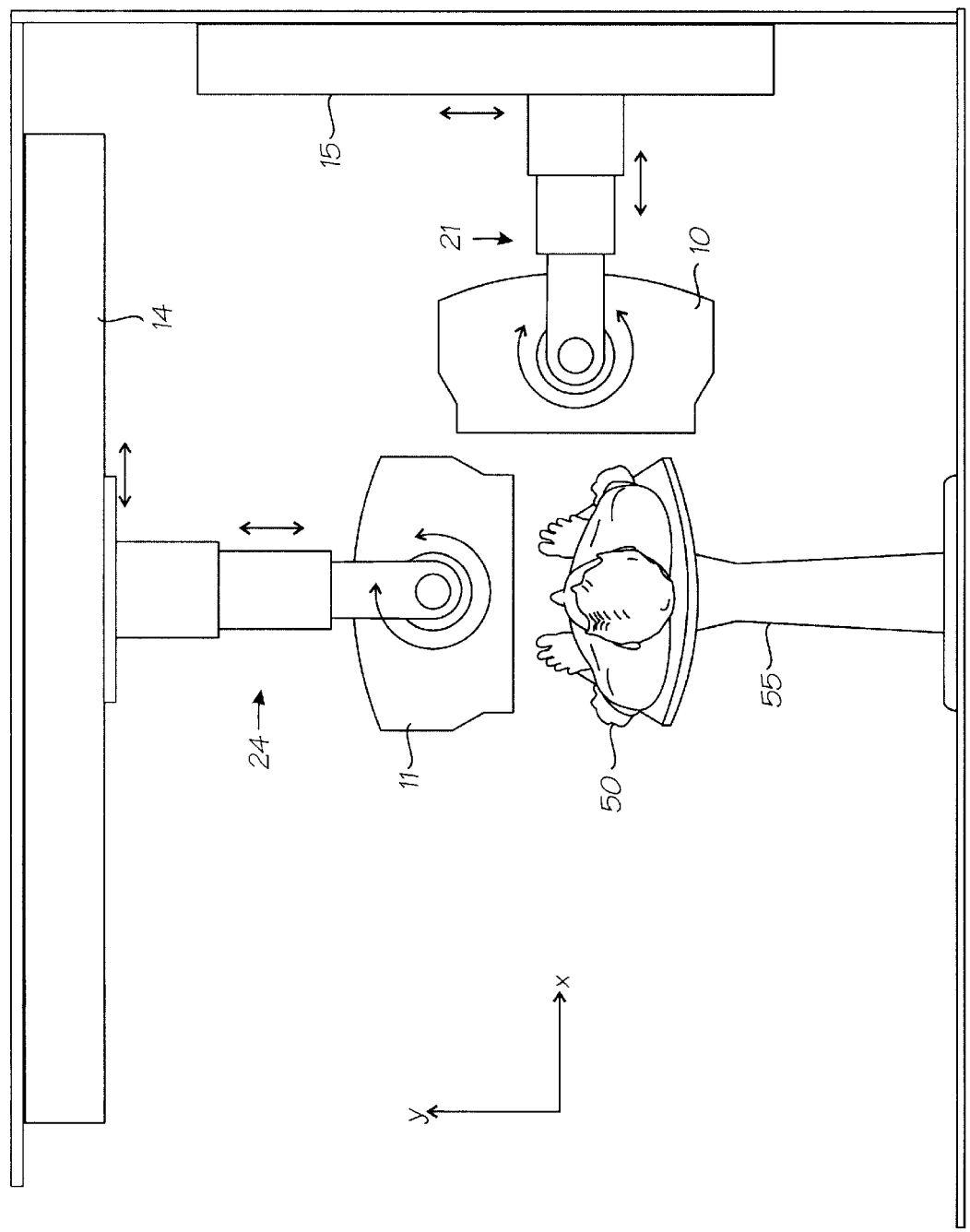
FIG. 11C shows an imaging system which includes both an overhead gantry and a wall-mounted gantry.

In certain embodiments, a wall-mounted gantry can be combined with an overhead gantry, as illustrated by FIG. 11C. In FIG. 11C, detector 10 is supported by a wall-mounted gantry, while detector 11 is supported by an overhead gantry. Note that the wall-mounted gantry of FIG. 11C includes a telescoping support arm 21 supporting detector 10.

Figure 12:
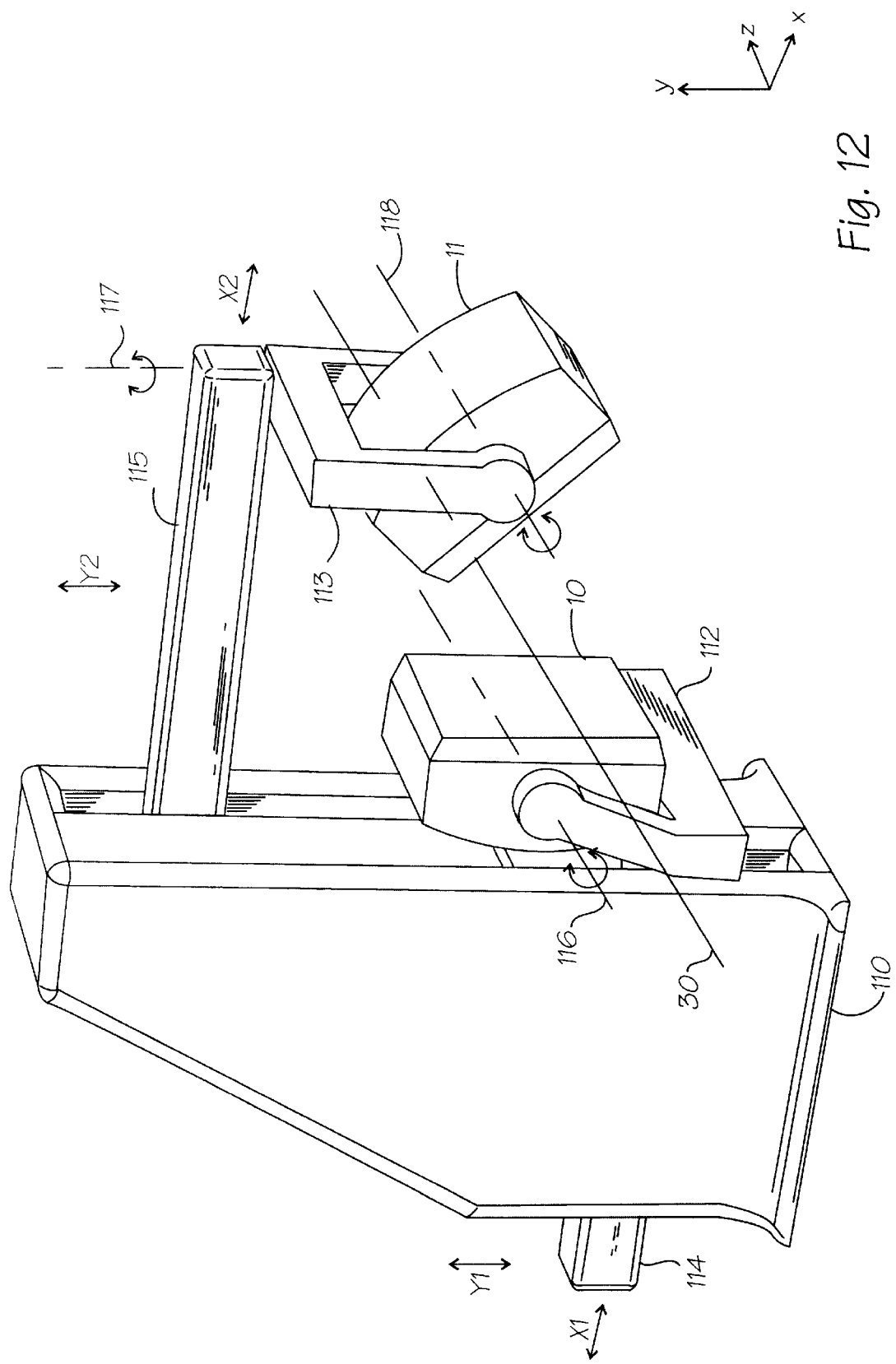
FIG. 12 illustrates an imaging system with a floor-mounted gantry which provides two-axis linear and rotary detector motion.
Figure 13:
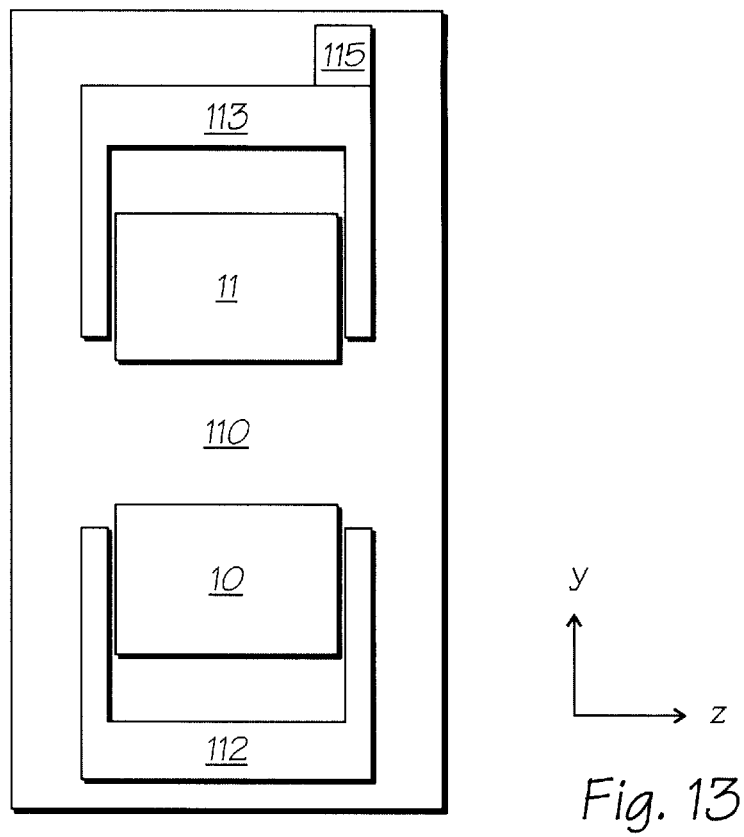
FIG. 13 illustrates a frontal view of the imaging system of FIG. 12.
Figure 14:
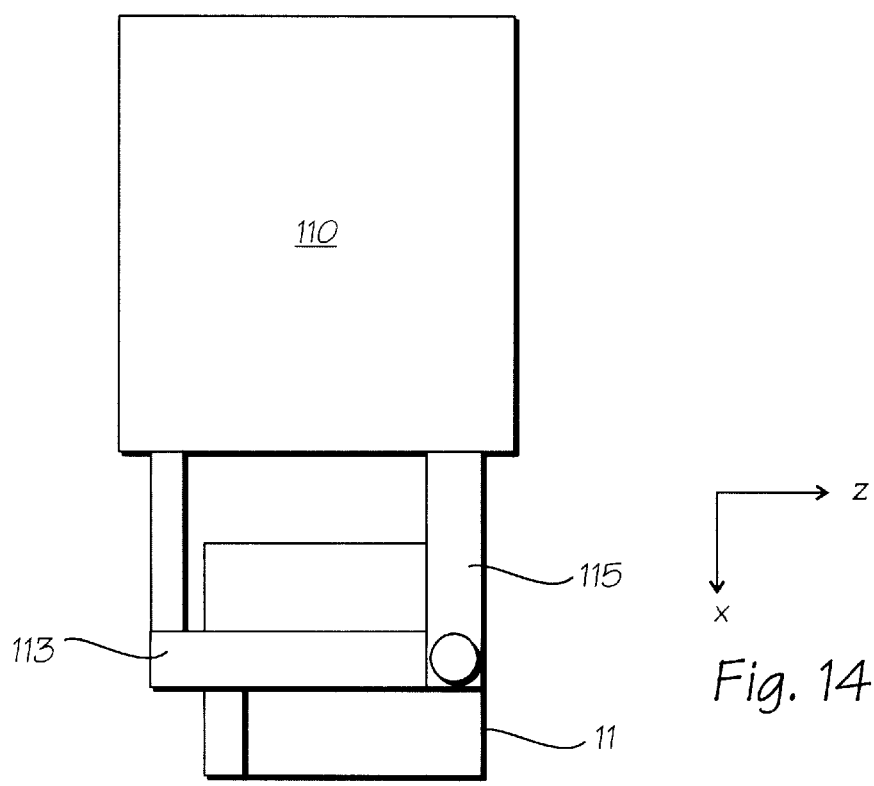
FIG. 14 illustrates a top view of the imaging system of FIG. 12.

FIG. 12 illustrates a perspective view of yet another embodiment of the present invention. FIGS. 13 and 14 show side and top views, respectively, of the imaging system of FIG. 12. As with the above-described embodiments, the gantry of FIG. 12 uses combinations of linear detector movements to place detectors 10 and 11 in various angular positions about the longitudinal axis 30. In contrast with the above-described embodiments, however, the imaging system of FIG. 12 includes a floor-based gantry for supporting and positioning the detectors 10 and 11. Table motion is used to move the patient relative to the detectors along the z axis.

The gantry includes a floor-mounted base 110, beams 114 and 155, and yokes 112 and 113. Beams 114 and 115 are coupled to base 110 and maintained in horizontal orientations. Each of beams 114 and 115 is movable in translation independently in both the x direction and the y direction. Yokes 112 and 113 are coupled to beams 114 and 115, respectively. Detectors 10 and 11 are coupled to yokes 112 and 113, respectively, so as to be pivotable about axes 116 and 118. Hence, detector 10 can be placed into any of a number of different angular positions about the longitudinal axis 30 using a combination of horizontal and vertical translational movements of beam 114 and pivoting movement of detector 10 about axis 116. Similarly, using a combination of vertical and horizontal translational movements of beam 115 and pivoting of detector 11 about axis 118, detector 11 can also be placed in any of a number of different angular positions about the longitudinal axis 30. Detectors 10 and 11 together allow a 360-degree range of projection angles to be covered.

Figure 15:
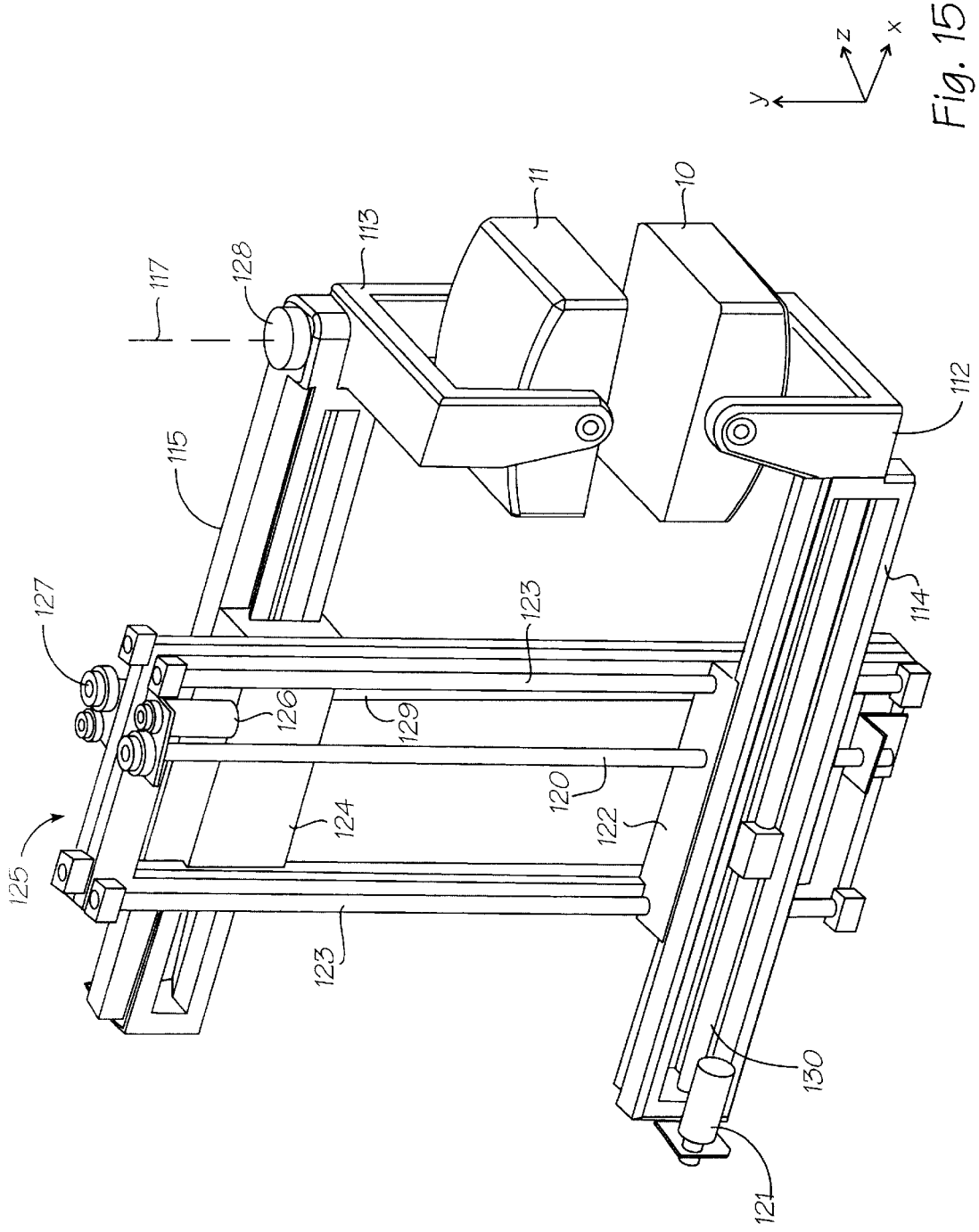
FIG. 15 illustrates the internal components of the gantry of FIGS. 12 through 14.

FIG. 15 shows the internal components of the base 110, according to one embodiment. Inside the base 110, a support frame 125 includes vertically-oriented y-guides 123. A first y-carriage 122, which supports beam 114, is movable vertically along y-guides 123. A first motor/gear-train assembly 126 provides vertical movement of y-carriage 122 through lead screw 120. Similarly, a second y-carriage 124, which supports beam 115, is also movable vertically along y-guides 123. A second motor/gear-train assembly 127 provides vertical movement of y-carriage 124 through lead screw 129.

Y-carriage 122 supports beam 114 such that beam 114 is movable horizontally along the x axis. A third motor/gear-train assembly drives lead screw 130 within beam 114 to provide motion of beam 114 along the x axis. Similarly, y-carriage 124 supports beam 115 such that beam 115 is movable horizontally along the x axis. A fourth motor/gear-train assembly and lead screw (not shown) provide motion of beam 115 along the x axis. Pivot 128 enables yoke 113 to be pivoted about axis 117.

Thus, a nuclear medicine imaging system has been described which has an overhead gantry that provides three-axis linear and rotary detector motion. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A medical imaging system comprising:
   a radiation detector to acquire image data of an object; and
   a gantry to suspend the detector from a position above the object and configured to position the detector at a plurality of angular positions about an axis for acquisition of the image data, the gantry such that the detector is suspended from above the object while the detector is positioned at each of the plurality of angular positions, the plurality of angular positions including positions in which the detector is located substantially below the object.

2. A medical imaging system according to claim 1, wherein the gantry is further such that the detector is suspended from above the object while the detector is positioned at each of the plurality of angular positions when the plurality of angular positions corresponds to a range of projection angles of approximately 180 degrees about the axis, such that the plurality of angular positions includes a position of the detector directly above the object and a position of the detector directly below the object.

3. A medical imaging system comprising:
a gamma radiation detector to acquire image data of an object; and
a gantry including a support arm, the support arm having an upper end located above both the object and the detector and a lower end coupled to the detector, the support arm suspended downward from the upper end, the gantry capable of positioning the detector at a plurality of angular positions about an axis to acquire image data of the object, the gantry such that the upper end of the support arm remains above both the object and the detector while the detector is positioned at each of the plurality of angular positions, the plurality of angular positions corresponding to a range of angles substantially greater than 90 degrees about the axis, the plurality of angular positions including positions in which the detector is located substantially below the object.

4. A medical imaging system according to claim 3, wherein the gantry is further such that the upper end of the support arm is above both the object and the detector while the detector is positioned at each of the plurality of angular positions when the plurality of angular positions corresponds to a range of angles of approximately 180 degrees about the axis.

5. A medical imaging system according to claim 3, wherein the gantry comprises a carriage supported above the object, the upper end of the support arm coupled to the carriage, the carriage movable along a first horizontal axis, and wherein the support arm is coupled to the carriage such that the support arm is movable along a second horizontal axis perpendicular to the first horizontal axis.

6. A medical imaging system according to claim 5, wherein the support arm is capable of moving the detector in translation along a substantially vertical axis.

7. A medical imaging system according to claim 3, further comprising a second radiation detector coupled to said support arm.

8. A medical imaging system according to claim 7, wherein the support arm is substantially Y-shaped.

9. A medical imaging system according to claim 3, wherein the support arm is substantially ring-shaped and is rotatable along a curvilinear path to rotate the detector about the object.

10. A medical imaging system according to claim 9, further comprising a second radiation coupled to the support arm.

11. A nuclear medicine imaging system comprising:
a gantry including a first arm assembly and a second arm assembly, the first and second arm assemblies each having an upper end located above an object to be imaged and suspended downward from the upper end; and
a first gamma ray detector coupled to a lower end of the first arm assembly;
a second gamma ray detector coupled to a lower end of the second arm assembly, the gantry capable of positioning each of the first and second gamma ray detectors at a plurality of angular positions about a longitudinal axis to acquire image data of the object by moving the first and second gamma ray detectors along independent paths.

12. A nuclear medicine imaging system according to claim 11, wherein the plurality of angular positions corresponds to a range of projection angles about the axis of approximately 180 degrees for each of the first and second detectors, and wherein the upper end of each of the first and second arm assemblies remains located above the object while the corresponding detector is positioned at each of the plurality of angular positions.

13. A nuclear medicine imaging system according to claim 12, wherein the gantry comprises a carriage supported in a position above the object, wherein the first and second arm assemblies each are movably coupled to the carriage at the upper end.

14. A nuclear medicine imaging system according to claim 13, wherein the carriage is movable in translation along a first horizontal axis.

15. A nuclear medicine imaging system according to claim 14, wherein the first and second arm assemblies are movable in translation along a second horizontal axis perpendicular to the first horizontal axis to provide linear movement of the first and second detectors, respectively, along the second horizontal axis.

16. A nuclear medicine imaging system according to claim 15, wherein the first and second arm assemblies are configured to provide linear movement of first and second detector, respectively, along a substantially vertical axis.

17. A nuclear medicine imaging system comprising:
a carriage supported above an object to be imaged;
a first arm assembly having an upper end movably coupled to the carriage, the first arm assembly suspended downward from the upper end;
a second arm assembly having an upper end movably coupled to the carriage, the second arm assembly suspended downward from the upper end; and
a first gamma ray detector coupled to a lower end of the first arm assembly; and
a second gamma ray detector coupled to a lower end of the second arm assembly;
the carriage and the first and second arm assemblies operable to position each of the first and second detectors at a plurality of angular positions about the object to acquire image data of the object, the plurality of angular positions corresponding, in aggregate, to a range of projection angles of approximately 360 degrees, wherein the first and second detectors remain downwardly suspended from the carriage through the first and second arm assemblies, respectively, while positioned at each of the angular positions.

18. A nuclear medicine imaging system according to claim 17, wherein the carriage is movable in translation along a first horizontal axis.

19. A nuclear medicine imaging system according to claim 18, wherein the first and second arm assemblies each are coupled to the carriage so as to be movable in translation along a second horizontal axis perpendicular to the first horizontal axis.

20. A nuclear medicine imaging system according to claim 19, wherein the first and second arm assemblies are for providing linear movement of the first and second detectors, respectively, along a substantially vertical axis.

21. A nuclear medicine imaging system comprising:

a plurality of gamma ray detectors; and first support means for providing support, located in a position substantially higher than an object to be imaged; and second support means for downwardly suspending the gamma ray detectors from the first support means, the first and second support means further for cooperating to position the detectors at a plurality of angular positions about an object to acquire image data of the object, the plurality of angular positions corresponding to, for any one of the detectors, a range of projection angles of approximately 180 degrees, such that each detector remains downwardly suspended from the first support means by the second support means while positioned at each of the plurality of angular positions and while the first support means remains supported in a position substantially higher than the object to be imaged.

22. A nuclear medicine imaging system according to claim 21, wherein the plurality of angular positions includes, for any of the detectors, positions in which the detector is located substantially below the object to be imaged.

23. A nuclear medicine imaging system according to claim 22, wherein the plurality of angular positions corresponds, for all of the detectors in aggregate, to a range of projection angles of approximately 360 degrees.

24. A nuclear medicine imaging system according to claim 21, wherein the first support means comprises means for providing translation of the gamma ray detectors along a first horizontal axis.

25. A nuclear medicine imaging system according to claim 24, wherein the second support means further comprises means for providing translation of the gamma ray detectors along a vertical axis.

26. A nuclear medicine imaging system according to claim 25, wherein the first support means further comprises means for providing translation of the gamma ray detectors along a second horizontal axis perpendicular to the first horizontal axis.

27. A nuclear medicine imaging system according to claim 21, wherein the second support means comprises a substantially ring-shaped support, each of the detectors coupled to the substantially ring-shaped support, the substantially ring-shaped support rotatable along a curvilinear path to rotate the detectors about an object to be imaged.

28. A nuclear medicine imaging system according to claim 21, wherein the second support means comprises a substantially Y-shaped support, each of the detectors coupled to a different end of the substantially Y-shaped support, a third end of the substantially Y-shaped support coupled to the first support means.

29. A medical imaging system comprising:

a first radiation detector;

a second radiation detector; and a gantry suspending the first radiation detector and the second radiation detector from above the first radiation detector and the second radiation detector, the gantry capable of moving the first radiation detector in translation independently along each of three substantially perpendicular axes and capable of moving the second radiation detector in translation independently along each of three substantially perpendicular axes.

30. A medical imaging system according to claim 29, wherein the gantry comprises:

a carriage supported above an object to be imaged and movable in translation along a first horizontal axis;

a first support arm having an upper end movably coupled to the carriage such that the first support arm is movable in translation along a second horizontal axis perpendicular to the first horizontal axis, the first support arm suspended downward from the upper end, the first radiation detector coupled to a lower end of the first support arm, the first support arm capable of moving the first radiation detector along a first vertical axis.

31. A medical imaging system according to claim 30, wherein the gantry further comprises a second support arm having an upper end movably coupled to the carriage such that the second support arm is movable in translation along the second horizontal axis, the second support arm suspended downward from the upper end of the second support arm, the second radiation detector coupled to a lower end of the second support arm, the second support arm capable of moving the second radiation detector along a second vertical axis.

32. A medical imaging system according to claim 29, wherein the gantry comprises:

a frame mounted to a wall; and a member coupled to the frame and moveable along the frame in translation along a first horizontal axis; and a support arm coupled to the member and to the first radiation detector, the support arm moveable in translation along a vertical axis.

33. A medical imaging system according to claim 32, wherein the gantry further comprises means for moving the first radiation detector in translation along a second horizontal axis perpendicular to the first horizontal axis.

34. A medical imaging system comprising:

first and second gamma ray detectors;

support means for supporting the gamma ray detectors;

first motion means for moving each of the gamma ray detectors in translation in a first direction, wherein the first motion means comprises a carriage supported above an object to be imaged, the carriage movable in translation in the first direction;

second motion means for moving each of the first and second gamma ray detectors in translation in a second direction substantially perpendicular to the first direction, wherein the second motion means comprises:

a first support arm having an upper end movably coupled to the carriage such that the first support arm is movable in translation in the second direction, the first support arm suspended downward from the upper end, the first gamma ray detector coupled to a lower end of the first support arm; and a second support arm having an upper end movably coupled to the carriage such that the second support arm is movable in translation in the second direction, the second support arm suspended downward from the upper end, the second gamma ray detector coupled to a lower end of the second support arm; and third motion means for moving each of the first and second gamma ray detectors in translation in a third direction substantially perpendicular to the first and second directions.

35. A medical imaging system according to claim 34, wherein the medical imaging system is capable of using the first and second detectors to perform a single-photon emission computed tomography (SPECT) imaging scan of an object by positioning each of the first and second gamma ray detectors at a plurality of projection angles about the object.

36. A medical imaging system according to claim 34, wherein the third motion means comprises means for moving the first and second radiation detectors along a vertical axis.

37. A medical imaging system comprising:
a gantry including:
a support frame;
a carriage coupled to the support frame so that the carriage is movable in translation along a first horizontal axis;
a first support arm coupled to the carriage so that the first support arm is movable in translation along a horizontal axis substantially perpendicular to the first horizontal axis; and
a second support arm coupled to the carriage so that the second support arm is movable in translation along a second horizontal axis substantially perpendicular to the first horizontal axis;
a first gamma ray detector coupled to the first support arm and suspended from above by the first support arm; and
a second gamma ray detector coupled to the second support arm and suspended from above by the second support arm.

38. A medical imaging system according to claim 37, wherein the first and second support arms are operable to move the first and second gamma ray detectors, respectively, along a substantially vertical axis.

39. A medical imaging system according to claim 37, wherein the gantry is operable to move either of the first detector and the second detector from a first angular position about a longitudinal axis to a second angular position about the longitudinal axis, the first and second angular positions corresponding to a plurality of ECT projection angles, using a linear movement of the detector along the vertical axis in combination with a linear movement of the detector along one of the first and second horizontal axes.

40. A medical imaging system according to claim 37, wherein the carriage is supported by the support frame in a position substantially higher than an object to be imaged, such that the detector is suspended by the support arm in a position lower than the carriage.

41. A method of using a medical imaging system to acquire tomographic image data of an object, the imaging system including a radiation detector, the method comprising:
a) acquiring image data with the detector positioned in a location and orientation corresponding to an angular position about the object;
b) repositioning the detector to a new location corresponding to a new angular position about the object, including independently moving the detector in translation both vertically and horizontally;
c) reorienting the detector, if appropriate, according to the new angular position; and
d) repeating said a) through c) to acquire the image data with the detector positioned at a plurality of angular positions about the object.

42. A medical imaging system for acquiring image data of an object, the imaging system comprising:
a base;
a first support arm coupled to the base and aligned along a first horizontal axis, the first support arm movable in translation along the first horizontal axis and along a vertical axis;
a second support arm coupled to the base and aligned along a second horizontal axis parallel to the first horizontal axis, the second support arm movable in translation along the second horizontal axis and along the vertical axis;
a first radiation detector movably coupled to an end of the first support arm; and
a second radiation detector movably coupled to an end of the second support arm.

43. A medical imaging system for acquiring image data of an object, the imaging system comprising:
a base;
a first support arm aligned along a first horizontal axis, the first support arm movably coupled to the base such that the first support arm is movable in translation along both the first horizontal axis and a vertical axis;
a second support arm aligned along a second horizontal axis parallel to the first horizontal axis, the second support arm movably coupled to the base such that the second support arm is movable in translation along both the second horizontal axis and the vertical axis;
a first gamma ray detector coupled to the first support arm, the first gamma ray detector pivotable about a third horizontal axis, the third horizontal axis perpendicular to both the first and second horizontal axes; and
a second gamma ray detector coupled to the second support arm, the second gamma ray detector pivotable about a fourth horizontal axis parallel to the third horizontal axis.

44. A nuclear medicine imaging system comprising:
a first gamma ray detector;
a second gamma ray detector;
a carriage supported above an object to be imaged, wherein the carriage is movable in translation along a first horizontal axis;
a first support arm having an upper end movably coupled to the carriage and a lower end coupled to the first gamma ray detector, the first support arm suspended downward from the upper end, the first support arm movable in translation along a second horizontal axis perpendicular to the first horizontal axis, the first support arm capable of providing translational movement of the first gamma ray detector along a substantially vertical axis; and
a second support arm having an upper end movably coupled to the carriage and a lower end coupled to the second gamma ray detector, the second support arm suspended downward from the upper end of the second support arm, the second support arm movable in translation along the second horizontal axis, the second support arm capable of providing translational movement of the second gamma ray detector along a substantially vertical axis.

45. A medical imaging system comprising:
a first gamma ray detector;
a first support structure mounted to a wall, the first support structure including:
a first frame;
a first sliding member coupled to the first frame so as to be moveable in translation along a first horizontal axis; and
a first support arm coupled to the first sliding member and to the first gamma ray detector, the first support arm moveable in translation along a first vertical axis;
a second gamma ray detector;
and
a second support structure mounted to a ceiling in proximity to said wall, the second support structure including:

a second frame;

a second sliding member coupled to the second frame so as to be moveable in translation along a second horizontal axis; and a second support arm coupled to the second sliding member and to the second gamma ray detector, the second support arm moveable in translation along a third horizontal axis.

46. A medical imaging system according to claim 45, further comprising means for moving the first gamma ray detector in translation along a fourth horizontal axis substantially perpendicular to the first horizontal axis.

47. A medical imaging system according to claim 46, further comprising means for moving the second gamma ray detector in translation along a vertical axis.

48. A medical imaging system according to claim 47, wherein the first detector is pivotable about a fifth horizontal axis, the second detector is pivotable about a sixth horizontal axis parallel to the fifth horizontal axis, and wherein the first detector and the second detector are positionable in a plurality of projection angles about an object for tomographic imaging using only linear and pivotal movements of the first and second detectors.

49. A method of using a medical imaging system to acquire tomographic image data of an object, the imaging system including a radiation detector, the method comprising:

a) acquiring image data with the radiation detector positioned at an angular position about the object;

b) repositioning the radiation detector to a new angular position about the object using only linear movements of the radiation detector;

c) reorienting the radiation detector, if appropriate, based on the new angular position; and d) repeating said a) through c) to acquire the image data from a plurality of angular positions about the object.

50. A method according to claim 49, wherein said d) repeating said a) through c) is such that the plurality of angular positions corresponds to a range of angular positions about the object of approximately 180 degrees.

51. A method according to claim 49, wherein the radiation detector is suspended from above the object throughout said a) through d), and wherein the range of angular positions about the object includes an angular position in which the radiation detector is substantially below the object.

52. A method of using a medical imaging system to acquire tomographic image data of an object, the imaging system including a first radiation detector and a second radiation detector, the method comprising:

a) using the first radiation detector and the second radiation detector to acquire image data of the object, with the first radiation detector and the second radiation detector each positioned at a different angular position about the object;

b) repositioning the first and second radiation detectors each to a new angular position about the object using only linear movements of the first and second radiation detectors;

c) reorienting the first and second radiation detectors, if appropriate, based on the new angular positions; and d) repeating said a) through c) to acquire image data of the object from a total range of angular positions about the object of approximately 360 degrees.

53. A method according to claim 52, wherein the first and second radiation detectors are each suspended from above the object throughout said a) through d), and wherein the range of angular positions about the object is such that at least one of the first and second radiation detectors is positioned substantially below the object for at least one angular position.

* * * * *